(12) United States Patent
Austin et al.

(10) Patent No.: US 12,258,205 B2
(45) Date of Patent: Mar. 25, 2025

(54) APPARATUS FOR PREPARING A BEVERAGE

(71) Applicant: Luigi Lavazza S.p.A., Turin (IT)

(72) Inventors: Peter Austin, Basingstoke (GB); Paul Fletcher, Surrey (GB); David Knowles, St Albans (GB); Sam Hyde, Basingstoke (GB)

(73) Assignee: Luigi Lavazza S.p.A., Turin (IT)

( * ) Notice: Subject to any disclaimer, the term of this patent is extended or adjusted under 35 U.S.C. 154(b) by 0 days.

(21) Appl. No.: 18/205,688

(22) Filed: Jun. 5, 2023

(65) Prior Publication Data
US 2023/0312230 A1   Oct. 5, 2023

Related U.S. Application Data

(60) Continuation of application No. 16/734,054, filed on Jan. 3, 2020, now Pat. No. 11,667,464, which is a
(Continued)

(51) Int. Cl.
*A47J 31/14* (2006.01)
*A47J 31/36* (2006.01)
(Continued)

(52) U.S. Cl.
CPC .......... *B65D 85/8046* (2013.01); *A47J 31/14* (2013.01); *A47J 31/369* (2013.01);
(Continued)

(58) Field of Classification Search
CPC ............ B65D 85/8046; B65D 85/8052; B65D 75/5883; A47J 31/14; A47J 31/369; A47J 31/3695; A47J 31/407; A47J 31/4403
(Continued)

(56) References Cited

U.S. PATENT DOCUMENTS

| | | | |
|---|---|---|---|
| 4,818,544 | A | 4/1989 | Seward |
| 4,846,052 | A | 7/1989 | Favre et al. |

(Continued)

FOREIGN PATENT DOCUMENTS

| | | | |
|---|---|---|---|
| EP | 0179641 | A2 | 4/1986 |
| EP | 0247841 | A2 | 12/1987 |

(Continued)

*Primary Examiner* — Jimmy Chou
(74) *Attorney, Agent, or Firm* — The Belles Group, P.C.

(57) ABSTRACT

A beverage preparation capsule containing a beverage preparation ingredient, having a body with side walls formed from one or more substantially air- and liquid-impermeable sheet materials defining a chamber containing a beverage preparation ingredient and further defining an outlet channel having an upstream end in fluid communication with the chamber for escape of beverage from the chamber. At least a region of the outlet channel is filled by a filtration material for filtering the beverage escaping from the chamber. Also provided is a clamp assembly for preparing a beverage from such a capsule, the clamp assembly comprising two or more clamp members, wherein an inner wall of at least one of the clamp members comprises a concave base surface for receiving the capsule and one or more pressure pads projecting from the concave base surface for selectively constricting a region of the capsule.

14 Claims, 7 Drawing Sheets

Related U.S. Application Data division of application No. 15/633,135, filed on Jun. 26, 2017, now Pat. No. 10,543,979, which is a division of application No. 14/128,096, filed as application No. PCT/GB2012/051460 on Jun. 22, 2012, now Pat. No. 9,687,107.

(51) Int. Cl.
*A47J 31/40* (2006.01)
*A47J 31/44* (2006.01)
*B65D 75/58* (2006.01)
*B65D 85/804* (2006.01)

(52) U.S. Cl.
CPC ......... *A47J 31/3695* (2013.01); *A47J 31/407* (2013.01); *A47J 31/4403* (2013.01); *B65D 75/5883* (2013.01); *B65D 85/8052* (2020.05); *B65D 2575/583* (2013.01)

(58) Field of Classification Search
USPC .......................................................... 426/115
See application file for complete search history.

(56) References Cited

U.S. PATENT DOCUMENTS

| | | | |
|---|---|---|---|
| 4,882,055 A | 11/1989 | Stamstad | |
| 4,886,674 A | 12/1989 | Seward et al. | |
| 5,012,629 A | 5/1991 | Rehman et al. | |
| 5,325,765 A | 7/1994 | Sylvan et al. | |
| 5,758,473 A | 6/1998 | Patelli | |
| 5,840,189 A | 11/1998 | Sylvan et al. | |
| 5,895,672 A | 4/1999 | Cooper | |
| 5,935,659 A * | 8/1999 | Cane | B05C 17/002 |
| | | | 401/188 R |
| 6,358,545 B1 | 3/2002 | Chandler et al. | |
| 6,606,938 B2 | 8/2003 | Taylor | |
| 6,607,762 B2 | 8/2003 | Lazaris et al. | |
| 6,672,200 B2 | 1/2004 | Duffy et al. | |
| 6,805,041 B2 | 10/2004 | Colston et al. | |
| 6,810,788 B2 | 11/2004 | Hale | |
| 6,844,015 B2 | 1/2005 | Yuguchi | |
| D502,362 S | 3/2005 | Lazaris et al. | |
| 7,854,192 B2 | 12/2010 | Denisart et al. | |
| 8,039,034 B2 | 10/2011 | Ozanne | |
| 9,108,794 B2 | 8/2015 | Fu et al. | |
| 9,452,879 B2 | 9/2016 | Fu et al. | |
| 9,527,661 B2 | 12/2016 | Fu et al. | |
| 9,687,107 B2 | 6/2017 | Austin et al. | |
| 10,010,211 B2 | 7/2018 | Digiuni | |
| 10,849,455 B2 * | 12/2020 | Ezaz-Nikpay | B01F 31/55 |
| 2002/0002913 A1 * | 1/2002 | Mariller | A47J 31/3633 |
| | | | 99/495 |
| 2002/0148357 A1 | 10/2002 | Lazaris et al. | |
| 2004/0025701 A1 * | 2/2004 | Colston | A47J 31/3628 |
| | | | 99/279 |
| 2007/0062375 A1 | 3/2007 | Liverani et al. | |
| 2008/0141865 A1 | 6/2008 | Bardazzi | |
| 2008/0317931 A1 | 12/2008 | Mandralis et al. | |
| 2009/0114100 A1 | 5/2009 | Spinelli | |
| 2009/0130270 A1 | 5/2009 | Cortese | |
| 2009/0175986 A1 | 7/2009 | Doglioni Majer | |
| 2009/0183640 A1 | 7/2009 | Ozanne | |
| 2009/0280219 A1 | 11/2009 | Yoakim et al. | |
| 2009/0282987 A1 | 11/2009 | MacMahon et al. | |
| 2010/0011965 A1 | 1/2010 | Turi | |
| 2010/0077928 A1 | 4/2010 | Schmed et al. | |
| 2010/0154459 A1 | 6/2010 | Skalski et al. | |
| 2010/0189859 A1 | 7/2010 | Blanc et al. | |
| 2010/0196545 A1 | 8/2010 | Buffet et al. | |
| 2010/0239717 A1 | 9/2010 | Yoakim et al. | |
| 2011/0000376 A1 | 1/2011 | Kooijker et al. | |
| 2011/0003038 A1 | 1/2011 | Colantonio et al. | |
| 2011/0003040 A1 | 1/2011 | Graf et al. | |
| 2011/0027425 A1 | 2/2011 | Heijdel et al. | |
| 2011/0073607 A1 | 3/2011 | Fu et al. | |
| 2011/0076361 A1 | 3/2011 | Peterson et al. | |
| 2011/0100229 A1 | 5/2011 | Rivera | |
| 2011/0113969 A1 | 5/2011 | Rivera | |
| 2011/0142996 A1 | 6/2011 | Kruger | |
| 2011/0151075 A1 | 6/2011 | Peterson | |
| 2011/0168029 A1 | 7/2011 | Fulco | |
| 2011/0183043 A1 | 7/2011 | Reati | |
| 2011/0183055 A1 | 7/2011 | Mariller | |
| 2011/0226343 A1 | 9/2011 | Novak et al. | |
| 2011/0271844 A1 | 11/2011 | Mariller et al. | |
| 2011/0297005 A1 | 12/2011 | Mariller | |
| 2012/0031281 A1 | 2/2012 | Denisart et al. | |
| 2012/0067223 A1 | 3/2012 | Vuagniaux et al. | |
| 2012/0199007 A1 | 8/2012 | Larzul et al. | |
| 2012/0210878 A1 | 8/2012 | Mariller | |
| 2013/0022717 A1 | 1/2013 | Meyl et al. | |
| 2013/0202749 A1 | 8/2013 | Yauk et al. | |
| 2014/0287104 A1 | 9/2014 | Austin et al. | |
| 2015/0056352 A1 | 2/2015 | Dogan et al. | |
| 2015/0250347 A1 | 9/2015 | Fu et al. | |
| 2016/0068336 A1 | 3/2016 | Biesheuvel et al. | |
| 2017/0340160 A1 | 11/2017 | Fletcher et al. | |

FOREIGN PATENT DOCUMENTS

| | | | |
|---|---|---|---|
| EP | 0272922 A2 | 6/1988 | |
| EP | 0278773 B1 | 8/1988 | |
| EP | 0468079 A1 | 1/1992 | |
| EP | 0521186 A1 | 1/1993 | |
| EP | 0821906 A1 | 2/1996 | |
| EP | 0710462 A1 | 5/1996 | |
| EP | 1579793 A1 * | 9/2005 | .......... A47J 31/3695 |
| FR | 2527173 A1 | 11/1983 | |
| GB | 2121762 A | 1/1984 | |
| GB | 2122881 A | 1/1984 | |
| WO | WO 93/17932 A1 | 9/1993 | |
| WO | WO 94/01344 A1 | 1/1994 | |
| WO | WO 94/02059 A1 | 2/1994 | |
| WO | WO 99/05036 A1 | 2/1999 | |
| WO | WO 99/05044 A1 | 2/1999 | |
| WO | WO 01/60220 A1 | 8/2001 | |
| WO | WO 02/19875 A1 | 3/2002 | |
| WO | WO 02/087400 A1 | 11/2002 | |
| WO | WO 2007/093355 A1 | 8/2007 | |

* cited by examiner

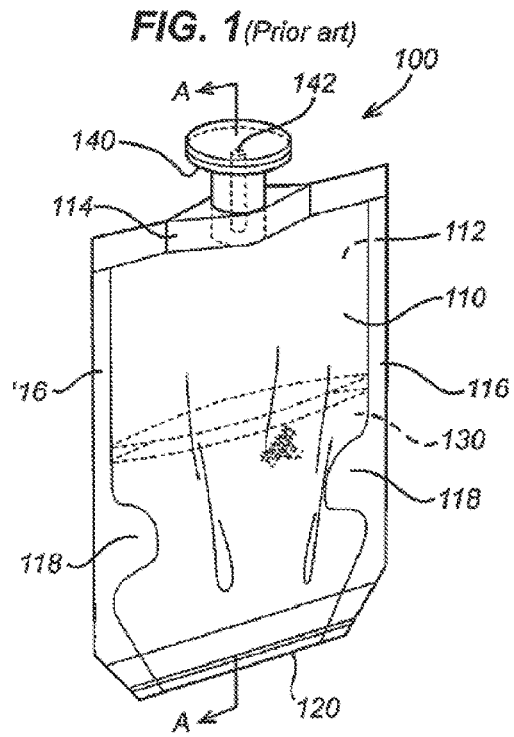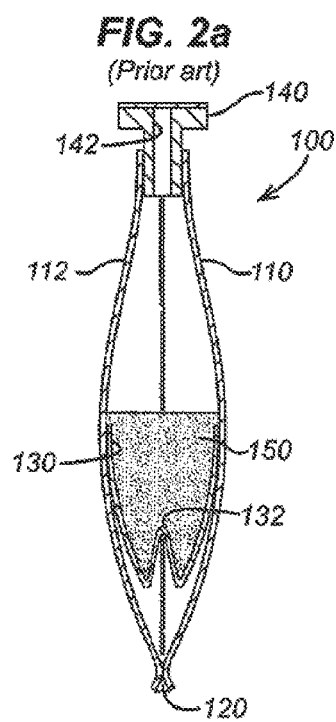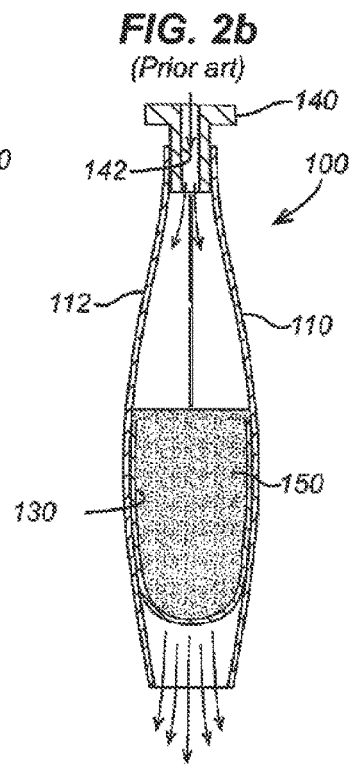

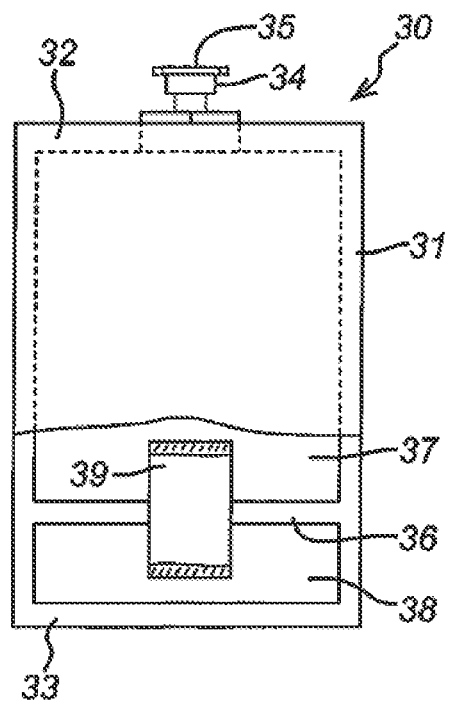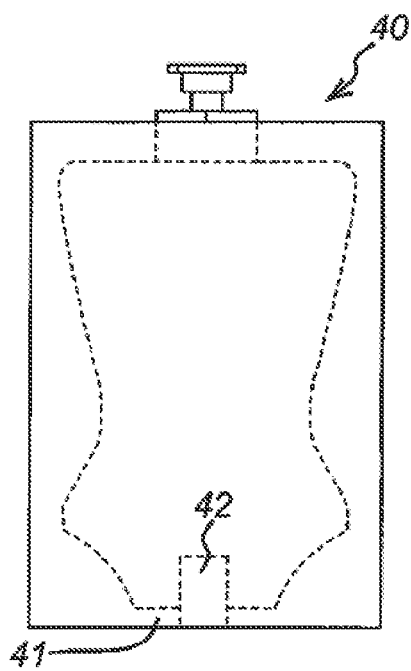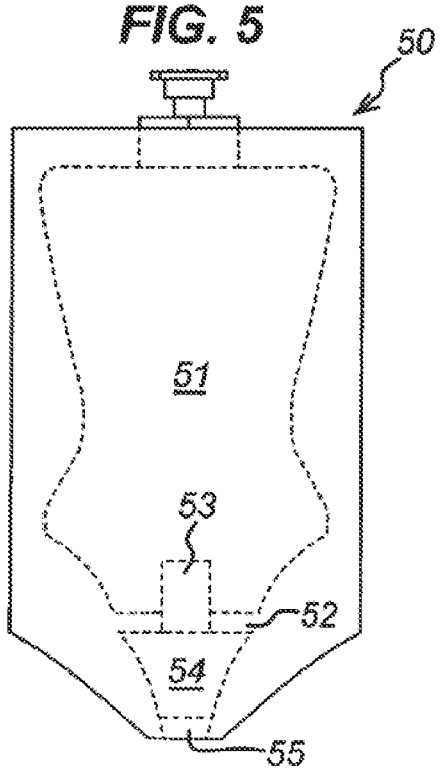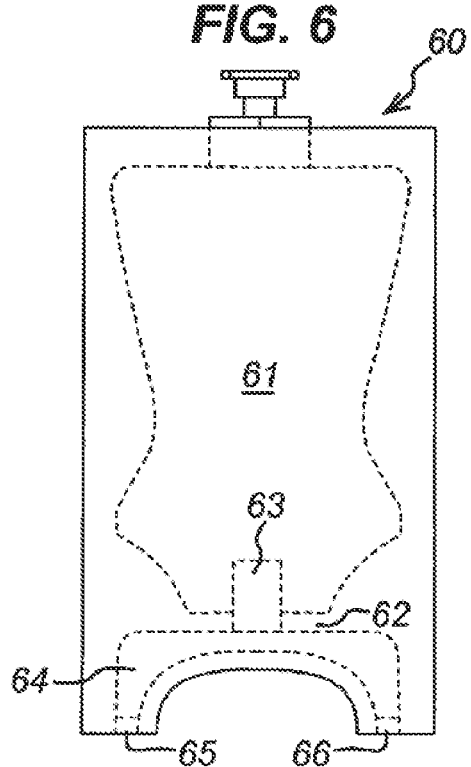

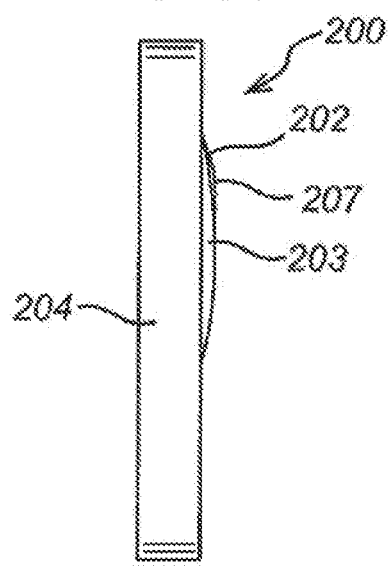
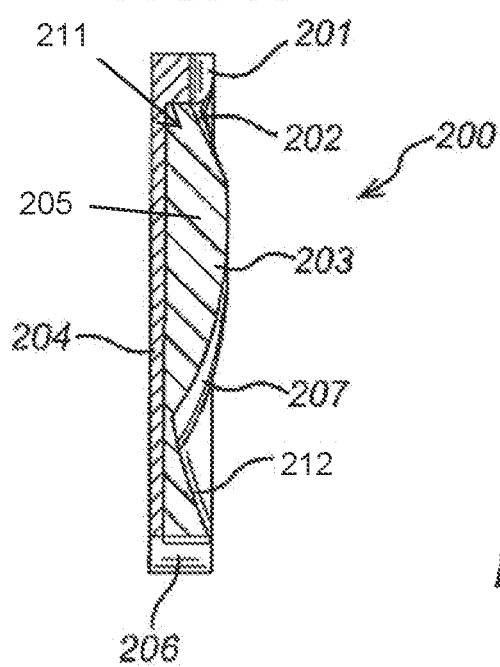
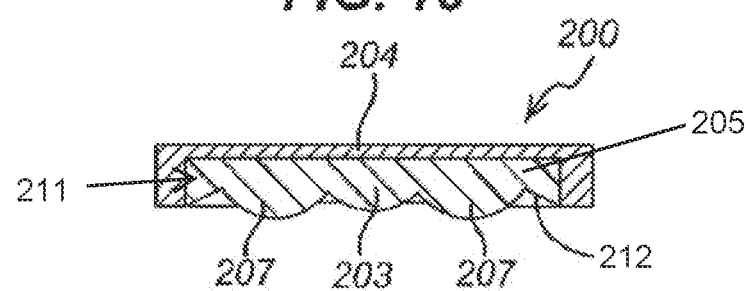

APPARATUS FOR PREPARING A BEVERAGE

CROSS-REFERENCE TO RELATED APPLICATIONS

This application is a continuation of U.S. patent application Ser. No. 16/734,054, filed Jan. 3, 2020, which is a continuation of U.S. patent application Ser. No. 15/633,135, filed Jun. 26, 2017, which is a divisional of U.S. patent application Ser. No. 14/128,096, filed Jun. 2, 2015, which is a national stage application under 35 U.S.C. § 371 of PCT/GB2012/051460, filed Jun. 22, 2014, which claims priority to United Kingdom Application No. 1118571.7 filed Oct. 27, 2011 and United Kingdom Application No. 1110848.7 filed Jun. 24, 2011, the entireties of which are incorporated herein by reference.

BACKGROUND

Beverage making systems are known in which the beverage is made by inserting a capsule containing a particulate beverage making ingredient, such as ground coffee, into a beverage making station of a beverage making apparatus. The apparatus then injects water into the capsule, where the beverage making ingredient dissolves in, or infuses into, the water to form the beverage. The beverage flows out of the capsule through a suitable outlet, which may be simply an opening or perforation in the capsule, or it may comprise an outlet tube that pierces an outlet region of the capsule. The capsule may incorporate a filter to prevent passage of solid components such as coffee grounds out of the capsule. Beverage making systems of this general type are described for example in WO94/01344, EP-A-0512468 and EP-A-0468079 (all Nestle), in U.S. Pat. No. 5,840,189 and WO-A-0160220 (Keurig), in EP-A-0272922 (Kenco), in WO-A-2007093355 (Samar Technologies), in US-A-20110142996 (Kruger), EP-A-0710462 (Illycaffe), and in EP-A-0821906, US-A-20110000376 and US-A-20110027425 (Sara Lee).

GB-A-2121762, GB-A-2122881, EP-A-0179641, EP-A-0247841 and WO-A-9905044 describe capsule-based beverage preparation systems of the type that are now widely used and marketed by Mars Drinks under the registered trade mark FLAVIA® An exemplary embodiment of a FLAVIA® capsule according to the state of the art is shown in FIGS. 1, 2a and 2b. Similar capsules are described in JP-A-4142266.

Referring to FIGS. 1, 2a and 2b, an exemplary FLAVIA®-type beverage preparation capsule 100 comprises front and back sheets 110, 112 of a liquid- and air-impermeable sheet material permanently bonded together around their top and side edges as described in more detail below. The front and back sheets are also bonded together along a bottom edge 120 of the capsule, but this bond is releasable under the effect of heat or pressure inside the capsule. For example, the bonding of the bottom edge 120 may be by means of a pressure-sensitive adhesive. Within the capsule 100 is a folded web of filter material 130 bonded to the inside walls of the front and back sheets. The web of filter material supports a beverage preparation ingredient 150, such as ground coffee or leaf tea. The capsule 100 further comprises a nozzle 140 having tubular bore 142. The nozzle is inserted into the top edge of the capsule and bonded in airtight fashion to the front and back sheets, the nozzle being flanged to assist in locating the capsule 100 correctly with a beverage preparation machine. The nozzle bore is initially sealed by a suitable airtight freshness barrier.

In use, the capsule 100 is introduced into a FLAVIA® dispensing machine, which comprises a clamp to grip the nozzle under the flange, and a hollow injector tube with a mechanism to insert the hollow injector tube into the nozzle bore, thereby piercing the freshness barrier. The dispensing machine further comprises a source of hot water and a pump to inject the hot water through the injector tube into the capsule. Upon introduction of the hot water through the injector tube and the nozzle bore, the beverage preparation ingredient 150 contained in the capsule 100 is mixed with the hot water and a beverage is brewed. The bottom seam 120 of the capsule 100 opens under the effect of heat and liquid pressure inside the capsule, and the beverage passes through the filter web 130 and the open bottom of the capsule and is collected in a receptacle located at a receptacle station situated directly below the capsule.

Referring to FIG. 2a, the sheet of web material 130 is folded to form a W in cross-section supporting the infusible beverage preparation ingredient 150. Upon introduction of liquid through the liquid conduct, the liquid pressure causes the apex 132 of the W to evert to provide a downwardly convex filter bed as shown in FIG. 2b. The eversion effect assists in the rupture of the pressure-sensitive seal of the bottom seam 120 to dispense a beverage brewed in the capsule. Further details and advantages of the everting filter webs may be found in EP-A-0179641. The FLAVIA® capsules and method provide beverages of superior quality, and furthermore provide the advantage of avoiding cross-contamination of the beverage preparation apparatus by successive beverages because the beverage does not contact any part of the apparatus after preparation.

Current beverage dispensing systems of the FLAVIA® type are adapted to prepare beverages by injection of hot water at only slightly elevated pressures, for example less than 1 bar gauge pressure. The capsules are not designed to operate at higher pressures. In particular, injection of water at higher pressures could cause the filter to separate from the pack. However, the preparation of certain premium beverages, in particular espresso coffee, requires water to be passed through the coffee bed at a pressure greater than 5 bar and up to about 20 bar. A need therefore remains for capsules, apparatus and beverage preparation methods for the preparation of espresso coffee and other high-pressure extraction beverages that also give the above-identified benefits of quality and no cross-contamination.

It is also known to brew individual portions of espresso coffee from individual capsules of ground coffee. The capsules typically contain a portion of ground coffee, tightly compacted in a capsule having a frustoconical or oblate spheroid shape and formed from air- and moisture-impermeable material. The capsule is inserted into a rigid, metal brewing chamber that is normally shaped to fit around the capsule tightly. The brewing chamber has a filter element in its base, means to pierce the underside of the capsule, and means to inject hot water at a pressure of 500-1500 kPa (5-15 bar) into the interior of the capsule to brew espresso coffee. Espresso coffee brewing capsules and systems of this type are described, for example, in WO93/17932 and WO94/02059.

A drawback of existing espresso brewing capsules is that they are adapted for use with conventional espresso machines that have a rigid brewing cavity dimensioned to receive a bed of coffee of specific dimensions and to apply the necessary pressure to such a bed of coffee. There is limited scope for varying the amount of coffee in the capsule, or for varying the degree of compaction of the coffee bed during brewing. A further drawback of the existing espresso systems is cross contamination between the successive brews, since the beverages exiting capsule passes through, and therefore contaminates, the base part of the brewing chamber.

EP-A-0521186 describes a capsule containing a compressed beverage brewing ingredient, such as ground coffee, for use in espresso-type machines. The capsule is deformable to assume the shape of the cavity of whichever espresso machine it is used in. This removes the need for a special adapter to adapt existing espresso machines to the exact shape and configuration of the capsule. Unfortunately, it also means that the coffee in the capsule may be insufficiently compacted for optimal espresso coffee brewing. The problem of cross-contamination by successive brews also exists for this configuration.

EP-A-0821906 describes methods of beverage brewing in which a vacuum pack containing a beverage brewing ingredient is placed in a clamp, hot water is injected into the vacuum pack through a hollow needle, and the brewed beverage is allowed to escape through a closing seam in the vacuum pack. The pack includes a movable plate opposite the closing seam of the vacuum pack that is used to compress the vacuum pack in the clamp before brewing. The plates making up the brewing cavity are rigid, flat plates. These plates cannot apply high pressure to squeeze the vacuum pack without risk of bursting the pack.

WO-A-0219875 describes an apparatus for the brewing of a beverage by transmission of an aqueous fluid through a capsule (capsule) containing a beverage brewing ingredient, said apparatus comprising: one or more injectors to inject the aqueous fluid into the capsule during said brewing; and a clamp for the capsule, said clamp comprising one or more members that are movable to open and close the clamp, said members having inner surfaces which in a closed position of the clamp define a cavity adapted to substantially enclose and support the capsule during said brewing and further adapted to define a beverage exit pathway in a lower part of the cavity, and wherein the inner surface of at least one clamp member comprises at least one deformable region mounted on a support that is movable while the clamp is in said closed position, whereby the shape of said cavity or said exit pathway can be changed while the clamp is in said closed position to provide a desired brewing configuration of the capsule. The capsule is suitably a capsule of the FLAVIA® type, optionally with modifications.

Channeling of liquid through the compressed bed of beverage preparation material during brewing may occur when preparing beverages using capsule-based (i.e. capsule-type) systems, especially where relatively high pressures are required such as in the preparation of espresso and espresso-type beverages. This channeling directs the liquid through preferred pathways in the compressed bed of beverage preparation material preventing uniform exposure of the beverage preparation material to the liquid and resulting in wasted beverage preparation material and a beverage having reduced concentration of dissolved or infused material. Channeling may occur in particular if the beverage ingredient is not uniformly and/or sufficiently compressed in the clamp prior to and during water injection.

Accordingly, a need remains for improved capsules, apparatus and methods for preparing beverages from capsules, especially at high pressures such as for producing espresso and espresso-type beverages from flexible capsule-type packs.

BRIEF SUMMARY

In a first aspect, the present invention provides a beverage preparation capsule containing a beverage preparation ingredient, the beverage capsule comprising a body having side walls formed from one or more substantially air- and liquid-impermeable sheet materials defining a chamber containing a beverage preparation ingredient and further defining an outlet channel having an upstream end in fluid communication with said chamber for escape of beverage from said chamber, wherein at least a region of said outlet channel is filled by a filtration material for filtering said beverage escaping from said chamber.

In a second aspect, the present invention provides a clamp assembly for preparing a beverage from a capsule wherein the capsule has at least one flexible wall, the clamp assembly comprising two or more clamp members, at least one clamp member being movable to open and close the clamp assembly, wherein respective inner walls of said clamp members in a closed position define a chamber adapted to substantially enclose and support the capsule during beverage preparation, the chamber having an inlet region for injection of water and an outlet region for escape of a beverage, wherein said inner wall of at least one of said clamp members comprises a concave base surface for receiving said capsule and one or more pressure pads projecting from said concave base surface in a region proximate to said inlet region for selectively constricting a region of said capsule proximate to said inlet region.

In a further aspect, the present invention provides a beverage preparation apparatus comprising: one or more clamp assemblies according to the present invention; an injector for injecting water into a capsule held inside the clamp assembly; and a pump for pumping said water through said injector at a pressure greater than 1 bar gauge.

In a further aspect, the present invention provides a beverage preparation system comprising a beverage preparation apparatus according to the invention, and further comprising a plurality of beverage preparation capsules according to the invention, wherein said plurality of capsules contain different beverage preparation ingredients, respectively.

In a further aspect, the present invention provides a method of making a beverage comprising inserting a beverage preparation capsule according to the present invention into the clamp assembly of a beverage preparation apparatus according to the present invention such that an outlet of said capsule is pinched between the clamp members in said outlet region; injecting an aqueous liquid into said capsule in said inlet region to produce a beverage in said capsule; and allowing said beverage to escape through said outlet region.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 1, 2a and 2b show a FLAVIA® type capsule according to the prior art as hereinbefore described;

FIG. 3 shows a plan view, partially cut away, of a first beverage preparation capsule according to the present invention;

FIG. 4 shows a plan view of a second beverage preparation capsule according to the present invention;

FIG. 5 shows a plan view of a third beverage preparation capsule according to the present invention;

FIG. 6 shows a plan view of a fourth beverage preparation capsule according to the present invention;

FIG. 14 shows a side elevation view of the clamp member of FIG. 12;

FIG. 15 shows a schematic longitudinal cross section of the clamp member of FIG. 12 through line A;

FIG. 16 shows a schematic horizontal cross section of the clamp member of FIG. 12 through line B;

DETAILED DESCRIPTION

Figure 7:
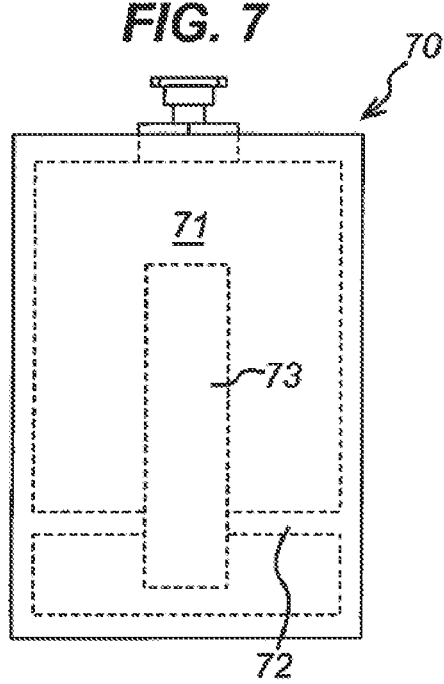
FIG. 7 shows a plan view of a fifth beverage preparation capsule according to the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

In a first aspect, the present invention provides a beverage preparation capsule containing a beverage preparation ingredient, the beverage capsule comprising a body having side walls formed from one or more substantially air- and liquid-impermeable sheet materials defining a chamber containing a beverage preparation ingredient and further defining an outlet channel having an upstream end in fluid communication with said chamber for escape of beverage from said chamber, wherein at least a region of said outlet channel is filled by a filtration material for filtering said beverage escaping from said chamber.

The term "capsule" as used herein refers to a suitably sealed container carrying beverage preparation material, typically particulate material such as ground coffee, comprising at least one wall of flexible sheet material, typically two walls of flexible sheet material, such as the FLAVIA® type capsules described herein above and below.

The term "body" is used herein in its usual sense of a three-dimensional shape including an enclosure for retaining the beverage brewing ingredient. It will be appreciated that the capsule body may be of any suitable shape in plan view, including circular, square, other regular polygons, or trapezoidal.

The body defines an ingredient chamber in which the beverage preparation ingredient is stored, and in which the beverage is prepared by infusion or dissolution of the beverage preparation ingredient. The ingredient chamber is suitably substantially filled by the ingredient, for example at least about 50% of the volume of the chamber is filled by the ingredient. The uncompressed volume of the chamber is suitably from about 5 ml to about 100 ml.

The term "outlet channel" refers to a channel extending from the beverage ingredient chamber, through which the beverage escapes from the chamber during beverage preparation. The outlet channel is substantially free of beverage ingredient. The outlet channel has a length in the direction of flow of the beverage, and a cross-section perpendicular to that flow. The length of the outlet channel is suitably from about 1 mm to about 20 mm, for example about 5 mm to about 10 mm. The uncompressed mean cross-section area of the outlet channel is substantially less than that of the beverage ingredient chamber, for example the mean uncompressed cross-sectional area of the outlet channel is suitably no more than about 10% of the mean uncompressed cross-sectional area of the beverage ingredient chamber. Furthermore, as will be explained further below, the outlet channel is normally compressed (pinched) during beverage preparation to further reduce its cross-section. In embodiments, the mean width of the outlet channel is suitably from about 5 mm to about 30 mm, for example about 10 mm to about 20 mm, and the mean uncompressed depth of the outlet channel is less than about 4 mm, for example from about 0.4 mm to about 2 mm.

The outlet channel is at least partially filled with the filtration material. That is to say, at least a portion of the length of the outlet channel is substantially completely filled with the filtration material, whereby the beverage escaping from the ingredient chamber must pass through filtration material when transiting the outlet channel. Suitably, the filtration material extends along the whole width and length of the outlet channel, whereby the outlet channel is completely filled by the filtration material in use.

The capsule is suitably a sealed capsule formed from materials that are substantially impermeable to oxygen and moisture in order to preserve the freshness of the beverage ingredient. Preferably, the capsule is substantially shelf stable. That is to say, it may be stored at ambient temperature and atmospheric conditions for a period of at least 3 months, preferably at least one year, without significant deterioration of the contents.

The basis of operation of the capsules according to the invention is that the beverage is prepared by injection of water into the beverage ingredient chamber where the beverage is formed, and the beverage is filtered as it escapes from the ingredient chamber through the outlet channel. The filtration material fills (plugs) at least a portion of the length of the outlet so that the beverage cannot escape from the body without passing through the filter. The filtration material generates a back pressure across the outlet channel, whereby high brewing pressures can be maintained inside the ingredient chamber (e.g. for brewing espresso coffee) without excessively fast escape of beverage. This back pressure can be regulated or fixed by applying a pinch to the outlet channel to compress the filtration material, thereby varying the liquid escape cross-section through the outlet channel. The filtration material is suitably sufficiently compressible, and preferably resilient, to enable control of the liquid escape cross-section by compressing the filtration material.

In embodiments, the filtration material is in the form of a plug of filtration material located in said outlet channel, and optionally bonded to the side walls in the outlet channel. However, the filtration material is not normally bonded to the wall of the capsule inside the outlet channel. In certain embodiments the filtration material projects from the outlet channel into the chamber containing the beverage preparation ingredient, and it may also extend downstream of the outlet channel. For example, the filtration material may project from about 5 mm to about 100 mm into the capsule body, suitably from about 10 mm to about 50 mm into the capsule body. These embodiments reduce the tendency of beverage solids to block the small cross-section of the outlet, and therefore they provide more consistent flow.

In embodiments, the filtration material is in the form of a resilient filtration pad located in the outlet. Suitable materials for forming the filter are water-insoluble but suitably hydrophilic, food-acceptable materials. For example, they may comprise a liquid-permeable foam material such as a polyurethane foam or an open-cell polyolefin foam. More suitably, the filter comprises or consists essentially of fibers of substantially water-insoluble material, for example a woven or nonwoven fabric. The fibers making up the filter may be any suitable food-acceptable fibers such as cellulose fibers, polyolefin fibers or nylon fibers.

In certain embodiments, the filter is built up from multiple layers of a conventional beverage filter sheet material, for example the type of material used to form tea or coffee bags. In embodiments the filter would comprise at least 2, for example 3 to 6, stacked layers of the filter material. In these embodiments, for example, the filter could be made by rolling or folding a single sheet of filter material into multiple layers.

In embodiments, the filtration material is formed from a single sheet of beverage filter sheet material having opposed edges bonded to the inside of the beverage ingredient chamber and extending into the outlet chamber, with a V-fold located in or below the outlet channel, whereby the filtration plug in the outlet channel is formed by a double thickness of the filter sheet material in the outlet channel. Suitably, the single sheet is bonded across substantially the entire width of the beverage ingredient chamber.

Typically, each capsule body comprises at least one plastics sheet (e.g. thermoformed or injection molded sheet) and/or flexible film material. The sheet or flexible film material will usually be a laminate comprising two or more of the following layers: a thermoplastic sealant layer for bonding the sheet to other members of the package; a substantially gas-impermeable barrier layer, which suitably is a metal film such as aluminum film; adhesion layers to improve adhesion between other layers of the laminate; structural layers, for example to provide puncture resistance; and/or a printing substrate layer. The structural layers could be made of polyolefins, polyester, nylons, or other polymers as is well known in the art. In certain embodiments, the front and back of the capsule comprise flexible sheets.

In certain embodiments, the capsule may comprise or consist essentially of a compostable material. The term "compostable" signifies that the material is substantially broken down within a few months, suitably within a few weeks, when it is composted. Typically, the capsule is at least about 90% composted within six months, as determined by the method of ISO14855, as in EN13432. Thermoplastic compostable polymers that could be used for the capsule include polymers and copolymers of lactic acid and glycolic acid, polyhydroxybutyrates, polyvinyl alcohols (PVOH), ethylene vinyl alcohols (EVOH), starch derivatives, cellulose and cellulose derivatives, and mixtures thereof.

In one group of embodiments, the capsule may comprise two similar or identical sheets of flexible film material bonded together in face-to-face relation to form a flexible film sachet or capsule. Suitably materials and methods of manufacture are described, for example, in the already-cited patent specifications relating to the FLAVIA capsule system, for example GB-A-2121762, GB-A-2122881, EP-A-0179641, EP-A-0247841 and WO-A-9905044. In another group of embodiments the capsules may comprise a first sheet that has been formed, e.g. by thermoforming, into a cup or bowl shape with a flanged rim, and a second sheet that is bonded across the flanged rim to form the capsule. For example, the first sheet may be a relatively stiff thermoplastic sheet that has been thermoformed into a cup or bowl shape with a flanged rim, and the second sheet is a flat sheet, which may be of flexible film material, that is bonded across the flanged rim. Suitable capsule embodiments are described for example in the references listed above.

Suitably, the body is formed from front and back sheets, at least one of which is of flexible film material, said first and second sheets being bonded together in face-to-face relation along a top edge and opposed side edges, further comprising a bond between said said front and back sheets and extending across said capsule between said opposed side edges below said top edge, said bond having a gap defining said outlet.

The capsule is provided with an outlet from the beverage preparation chamber. Beverage prepared in the chamber can escape from the chamber through the outlet. For example, in embodiments wherein the body is formed from two sheets bonded in face-to-face relation (this includes embodiments having a single sheet folded over), the chamber may be defined by bonding the sheets together in face-to-face relation around a margin, and the outlet may be provided by leaving an unbonded region between the sheets in one of the margins. Suitably, the outlet is in the form of an elongate opening in a bottom edge of the chamber, for example a slit. The outlet suitably has a length of from about 0.5 cm to about 5 cm, more suitably from about 1 cm to about 3 cm. It will be appreciated that more than one such outlet could be provided.

In certain embodiments the capsule further comprises a downstream (outlet) chamber located in fluid communication with the downstream end of the outlet channel opposite the beverage ingredient chamber. The downstream chamber may be formed by bonding together sheets of capsule material in similar fashion to the beverage ingredient chamber. Suitably, the beverage ingredient chamber, the outlet, and the downstream chamber are all formed by bonding together unitary front and back faces of sheet material. The downstream chamber is suitably considerably smaller than the beverage ingredient chamber, for example no more than about 25% of the volume of the beverage ingredient chamber. The outlet channel and the downstream chamber (where present) are suitably located at an end of the capsule opposite to the locus of liquid injection, e.g. the injection nozzle of the capsule. In embodiments, the capsule is suitably substantially axially symmetric (i.e. has two-fold rotation/reflection symmetry about a longitudinal axis), and suitably the injection nozzle (where present), the outlet channel, and the downstream chamber (where present) lie on the longitudinal axis.

The downstream chamber may function as a conditioning chamber for the beverage exiting the outlet, that is to say a chamber in which bubbles within the liquid can separate from the liquid to form a "crema" on espresso coffee. Alternatively or additionally the downstream chamber may comprise one or more conduits for directing the beverage to one or more beverage outlets. For example, the downstream chamber may be bifurcated to direct the beverage to two outlets located adjacent to opposite edges of the capsule. In other embodiments, the downstream chamber may be funnel-shaped to direct the beverage to a single outlet located centrally. In these embodiments, the beverage outlet from the downstream chamber (or from the outlet channel where no downstream chamber is present) is suitably sealed with a suitable freshness barrier before use to preserve the freshness of the capsule contents.

The term "freshness barrier" refers to a barrier that is substantially impermeable to air or moisture so as to preserve the freshness of the beverage brewing ingredient by preventing ingress of air or moisture through the liquid guide before brewing commences. The freshness barrier may be released by an external mechanical force or thermal field applied during brewing. The freshness barrier is preferably releasable by the action of pressure and/or hot water from inside the capsule during brewing. For example, the freshness barrier may comprise a layer of a sealant that is released by the action of heat and/or moisture, such as an adhesive as described in EP-A-0179641 or WO99/05036.

In certain embodiments the capsule further comprises a nozzle through which liquid can be injected into the chamber containing the beverage preparation ingredient. The nozzle is suitably a thermoplastic nozzle having a tubular bore for receiving a liquid injector tube from a beverage preparation machine. The bore may be cylindrical, or it may have a non-circular cross-section. The nozzle may have a single outlet inside the chamber, or it may have a plurality of outlets inside the chamber, for example an outlet manifold for distributing the beverage making liquid within the enclosure. The nozzle outlet or outlets may be located at an edge of the capsule, or they may be located more centrally within the enclosure. Suitable nozzles are described in EP-A-0179641 and WO-A-9905036. The inlet end of the nozzle may comprise an annular seat (recess) around the bore for receiving an O-ring on the injection tube to form a pressure-tight seal between the injection tube and the nozzle.

Suitably, the nozzle is sealed by a frangible barrier to prevent escape of the beverage preparation ingredient prior to preparation of the beverage. The frangible barrier may comprise, or consist essentially of, a thin sheet of film material that can be pierced by a liquid injector tube on a beverage making machine. In other embodiments in which the nozzle is molded from thermoplastics, the frangible barrier may be a thermoplastic barrier molded in one piece with the nozzle, and having at least a peripheral region of weakness to enable the barrier to be pierced by a liquid injector tube on a beverage making machine.

Typically, the amount of ingredient contained in the capsules is sufficient for the preparation of one portion of beverage, i.e. in the case of espresso coffee from about 10 to about 250 ml, suitably from about 25 ml to about 125 ml of beverage. For example, the capsule may contain from about 2 g to about 25 g of ground coffee or from about 1 g to about 9 g of leaf tea.

In use, as explained further below, the capsule is substantially completely enclosed by, and in contact with, the inner surfaces of the clamp cavity. The cavity supports the beverage brewing capsule enclosed within the cavity, thereby enabling high hydrostatic pressures to be developed inside the capsule without bursting the capsule. Indeed, it is envisaged that the capsule could be formed with very thin walls, thereby reducing the amount of plastic waste material that remains after brewing.

Referring to FIG. 3, the capsule 30 according to the present invention is a modification of the capsule described in EP-A-0179641 and shown in FIGS. 1, 2a and 2b. It comprises two flexible laminate sheets. Each laminate sheet comprises an inner thermoplastic sealing film. The front and back sheets are bonded together along edge seams 31, top seam 32 and bottom seam 33. The bonding of the top and side edges is suitably by heat or ultrasonic bonding, to form a permanent weld between the sheets. At least a central region of the bottom seam 33 is bonded with a peelable adhesive that can be released by the action of heat and/or pressure of liquid inside the capsule, and/or assisted by heat applied from outside the capsule. A nozzle 34 is inserted into the top seam 32 of the capsule. The nozzle 34 has a central cylindrical bore sealed at the top by membrane 35.

A further transverse permanently bonded seam 36 between the front and back sheets extends across the capsule intermediate the top and bottom transverse seals to divide the capsule into a beverage ingredient chamber 37 and a downstream beverage collection/conditioning chamber 38. The intermediate seam does not extend completely across the capsule. An unbonded gap is left in the intermediate seam to provide the outlet channel from the beverage preparation chamber. This gap is filled by a filtration element 39 formed by rolling up and flattening a sheet of filter sheet material. The filtration element 39 is bonded to the front and back sheets in the gap. The filtration element projects into the beverage preparation chamber 37 so as to increase the area available for filtration and to prevent filter blocking in use.

Substantially filling the ingredient chamber 37 of the capsule there is about 15 g of ground roasted coffee. The capsule provides an oxygen and moisture-impermeable enclosure for the coffee until the capsule is used.

Referring to FIG. 4, the capsule 40 according to this embodiment is similar to that of FIG. 3, but does not include the beverage collecting/conditioning chamber. Instead, the bottom seam 41 of the capsule is a permanently bonded seam having a central gap similar to the gap in the intermediate seam of FIG. 3 so as to provide an outlet from the beverage chamber 43. A filtration element 42 is bonded in the gap. These embodiments may require secondary packaging, such as a pouch or capsule, to maintain ingredient freshness before use.

Referring to FIG. 5, the capsule 50 according to this embodiment is similar to that of FIG. 3, having a beverage preparation chamber 51, and intermediate seam 52 with a central outlet gap, and a filter element 53 filling the outlet gap. The capsule 50 is characterized by a funnel-shaped beverage collecting/conditioning chamber 54 that directs the beverage more accurately into a receptacle such as a cup. A releasable seal 55 in the bottom edge of the conditioning chamber 54, similar to the releasable seal in the bottom edge 34 of the embodiment of FIG. 3, maintains freshness of the capsule ingredients before use.

Referring to FIG. 6, the capsule 60 according to this embodiment is similar to that of FIG. 3, having a beverage preparation chamber 61, and intermediate seal 62 with a central gap forming the outlet channel from the beverage preparation chamber, and a filter element 63 filling the outlet gap. It is characterized by a bifurcated beverage collecting/ conditioning chamber 64 that resembles the outlet of a conventional espresso machine. The bifurcated collecting/ conditioning chamber 64 has two outlets 65, 66 proximate to opposite edges of the capsule. Each outlet 65,66 is sealed by releasable seal in the bottom edge thereof, similar to the releasable seal in the bottom edge 34 of the embodiment of FIG. 3, to maintain freshness of the capsule ingredients before use. The bifurcated chamber 64 directs the beverage accurately into a receptacle such as a cup, and furthermore results in a better conditioned foam "crema" on the resulting coffee. That is to say, a crema with a more uniform, small bubble size.

Referring to FIG. 7, the capsule 70 according to this embodiment is similar to that of FIG. 3, having a beverage preparation chamber 71, and intermediate seal 72 with a central gap forming the outlet channel from the beverage preparation chamber, and a filter element 73 filling the outlet gap. It is characterized by the filtration element 73 that extends into the ingredient chamber 71 for more than half of the height of the ingredient chamber, thereby achieving more efficient collection of beverage from the ingredient chamber.

Figure 8:
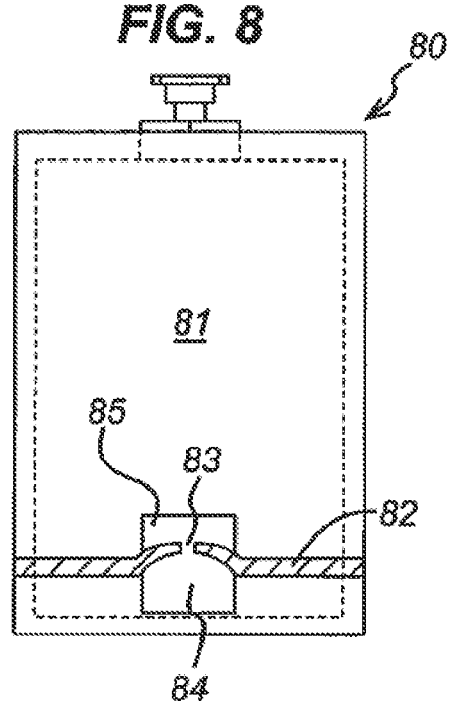
FIG. 8 shows a plan view of a sixth beverage preparation capsule according to the present invention.

Referring to FIG. 8, the capsule according to this embodiment is similar to that of FIG. 3, having a beverage preparation chamber 81, and intermediate seal 82 with a central gap forming the outlet channel from the beverage preparation chamber, and a filter element filling the outlet gap. It is characterized by very narrow gap (for example about 1 mm to about 10 mm wide) in the intermediate transverse seal 82. The filtration element is H-shaped, having a narrow part 83 that extends through the gap (outlet channel), and wide portions 84,85 above and below the gap. This configuration ensures that the filtration element is physically retained in the outlet channel, and furthermore increases the area for collection of beverage by the filtration element inside the ingredient chamber. Furthermore, the narrow gap may allow better control over back pressure and beverage flow rate through the outlet channel.

Figure 9A:
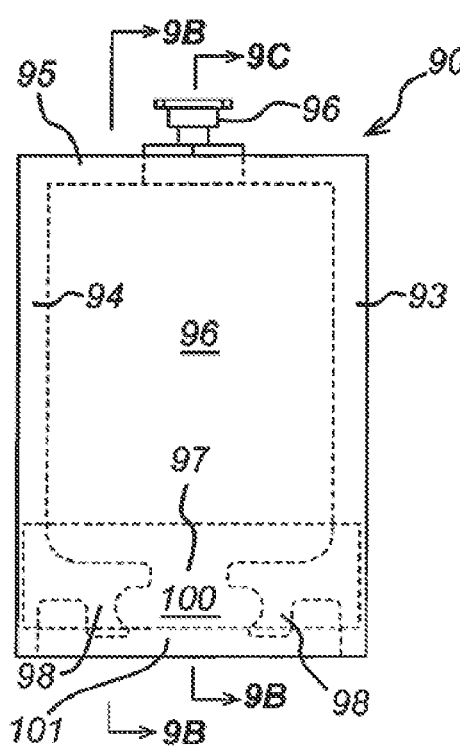
FIGS. 9A, 9B and 9C show a plan view and longitudinal and lateral cross-sectional views of a seventh beverage preparation capsule according to the present invention.
Figures 9B, 9C:
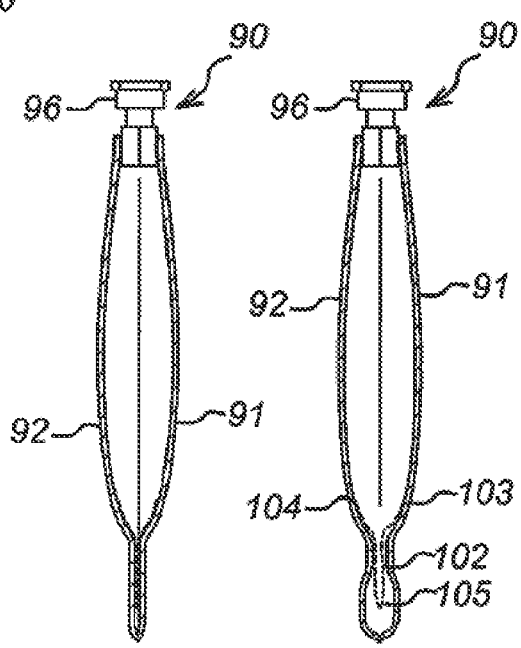
Figure 10:
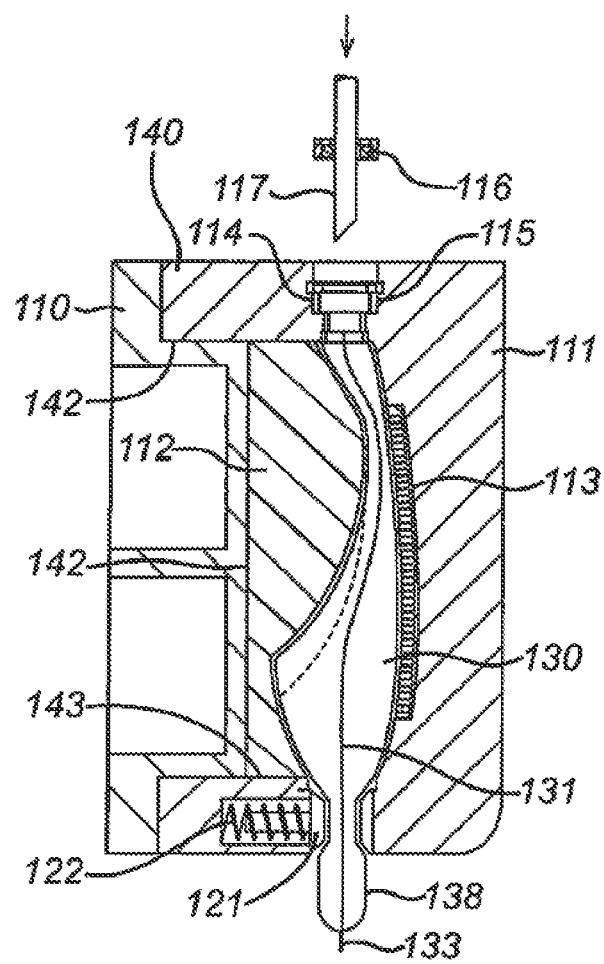
FIG. 10 shows a schematic longitudinal sectional view of a capsule according to the invention being used to prepare a beverage in a clamp according to the invention.

Referring to FIGS. 9 and 10, the capsule 90 according to this embodiment is similar to that of FIG. 1. The capsule 90 is formed from front and back sheets 91,92 of flexible sheet material bonded together by a permanent heat (or ultrasonic) seal alongside edges 93,94 and top edge 95. An injection nozzle 96 as hereinbefore described is bonded between the front and back sheets in the center of top edge 95 in air-tight fashion. The permanent heat seal also extends across a lower part of the capsule spaced from the bottom of the capsule to define the bottom of the beverage ingredient chamber 96 but with a central gap defining the outlet channel 97, as shown in dashed lines in FIG. 9A. The permanent heat seal further comprises curved downward extensions 98, 99 on either side of the longitudinal axis of the capsule below the outlet channel 97 defining the lateral edges of the downstream chamber 100. The bottom edge 101 of the capsule is sealed with a linear heat-releasable adhesive seal (also shown in dashed lines in FIG. 9A) providing a freshness barrier prior to use of the capsule. The width of the downstream chamber is intermediate the width of the beverage ingredient chamber and the narrower outlet channel 97.

In these and other embodiments, the filtration material in the outlet channel 97 is provided by a single, rectangular sheet of filter material 102 that is V-folded with opposed edges 103,104 bonded to the inside of the front and back sheets 91,92, respectively in similar fashion to the bonding of the filter sheet in the prior art capsules of FIGS. 1-2. The V-folded filter sheet extends downwardly through the outlet channel 97, with the bottom 105 of the V located towards the bottom of the downstream chamber 100. The outlet channel 97 is thereby filled by a double thickness of filter sheet material. It is noted that in regions where the V-folded filter sheet overlaps the permanent heat seal, the permanent heat seal is formed through the V-folded filter sheet so that the front and back sheets 91,92 and the V-folded filter sheet 102 are all bonded together. This is facilitated by the use of a filter sheet containing thermoplastic fibers, such as polypropylene fibers. However, the filter sheet is not bonded to the front and back faces in the outlet region.

It can readily be seen that the above capsules can be manufactured using only minor modification of the methods used to make the capsules of GB-A-2121762, GB-A-2122881, EP-A-0179641, EP-A-0247841 and WO-A-9905044.

In a second aspect, the invention provides a clamp assembly for preparing a beverage from a capsule wherein the capsule has at least one flexible wall, the clamp assembly comprising two or more clamp members, at least one clamp member being movable to open and close the clamp assembly, wherein respective inner walls of said clamp members in a closed position define a chamber adapted to substantially enclose and support the capsule during beverage preparation, the chamber having an inlet region for injection of water and an outlet region for escape of a beverage, wherein said inner wall of at least one of said clamp members comprises a concave base surface for receiving said capsule and one or more pressure pads projecting from said concave base surface in a region proximate to said inlet region for selectively constricting a region of said capsule proximate to said inlet region.

Suitably, the clamp comprises one or more rigid base members, more preferably two such rigid base members, that are movable together in face-to-face or clam-shell fashion to grip the capsule. Suitably, the clamp has a clam shell configuration, whereby two concave base members are releasably pivoted together, preferably about a pivot at the bottom of the clamp, to clamp the capsule therebetween.

One or more clamp inner surface may be formed of, or covered with a material that is conformable but substantially incompressible, for example a resilient material, such as a layer of elastomer. Typically, the layer of elastomer is from 5 to 25 mm thick and has Shore hardness of from 10 to 60 Shore, preferably from 20 to 50 Shore.

The resilience of the inner surface of the brewing cavity may differ in different regions of the surface so as to allow the shape of the cavity to change in response to pressure during brewing.

The clamp assembly is adapted to apply a pinch force to outlet of the capsule so as to achieve an optimum combination of beverage escape rate from the capsule and back pressure to optimize beverage quality and brewing speed.

For example, the exit region from the brewing chamber may comprise additional clamp members configured to pinch the bottom of the capsule to provide the constriction. Various arrangements are suitable, including (a) a fixed-configuration outlet constriction, (b) an adjustable constriction, and/or (c) a biased constriction.

In the simplest arrangement, the clamp assembly in the closed position has internal surfaces in the outlet channel region that define an opening of fixed size and shape that provides the desired degree of compression to the outlet channel of the capsule. For example, one clamp member may have a flat surface in this region and the other clamp member may have a flat surface with a channel of the desired dimensions cut into the surface thereof. When the flat surfaces are brought into abutment when the clamp assembly is closed, the desired opening in the bottom of the clamp is formed by said channel. Suitably, for example for use with capsules of the kind shown in FIGS. 9 and 10, the fixed gap provided in the bottom of the clamp has a depth of from about 0.4 mm to about 0.8 mm, and a width of from about 10 mm to about 20 mm, for example about 15 mm. This provides the desired pinch force on the outlet channel of the capsule.

In other embodiments, the size of the opening formed at the bottom of the clamp where the pinch force is applied to the capsule can be adjusted, for example by mounting the appropriate portion of one of the clamp members on a screw. This allows the size of the opening to be optimized for different capsule sizes, ingredients and/or desired backpressure in the capsule. Indeed, by increasing the size of the opening sufficiently, this allows the clamp to be used both for high-pressure (e.g. espresso) brewing, but also for low-pressure (e.g. filter coffee or tea) brewing. The opening is constricted for high-pressure brewing so as to maintain a high back pressure in the ingredient chamber. The opening is widened for low-pressure brewing so as to allow a satisfactory flow rate through the outlet channel while keeping the back pressure in the brewing chamber below about 1.5 bar.

In yet other embodiments, at least one of the members providing said pinch has an inner surface in said fluid exit region that is biased to apply a pinch force to a capsule in the chamber. The biasing means compensates for variations in pack shape, and also compensates for deformation of the clamp members as the capsule is pressurized by injected water. Suitably, the said inner surface in the fluid exit region may be biased by being supported on a spring. The biasing means may be adjustable to vary the bias force.

In beverage preparation systems of the type having a clamp assembly defining a chamber for enclosing a beverage preparation capsule having at least one flexible wall, the present inventors have found that improved beverage preparation can be achieved when the surface of one or more of the clamp members comprises one or more pressure pads that protrude into the chamber formed by the clamp assembly when in a closed position. The pressure pads assure uniform compression of the beverage ingredient bed inside the capsule. The pressure pads may be configured or profiled to optimize the flow of liquid through the beverage ingredient bed.

The inlet region of the clamp is normally located at a first end of the clamp cavity (also referred to herein as the "upper end") and the outlet region is normally located at the opposite end (also referred to herein as the "lower end"). In embodiments such as those described in detail herein, the inlet is suitably located above the outlet, for example substantially directly above the outlet. The term "longitudinal" refers to the direction from the inlet end to the outlet end. The term "transverse" or "horizontal" herein refers to a direction perpendicular to the longitudinal. The term "median line" herein refers to the transverse line located half-way between the inlet and the outlet. The term "region proximate to the inlet" refers to the region of the clamp cavity located between the median line and the inlet. The term "region proximate to the outlet" refers to the region of the clamp cavity located between the median line and the outlet.

The inner surfaces of the clamp members define a chamber for the beverage preparation capsule when the clamp assembly is in a closed position. The beverage preparation capsule is supported by and normally substantially completely enclosed by and in contact with the clamp members, thereby enabling high hydrostatic pressures to be developed inside the capsule without bursting the capsule. Indeed, it is envisaged that the capsule could be formed with very thin walls, thereby reducing the amount of plastic waste material that remains after use.

When the clamp assembly is in a closed position and enclosing the beverage preparation capsule in the chamber, the one or more pressure pads squeeze an upper part of the enclosed capsule prior to injection of water into the beverage preparation capsule. This in turn helps to hold and compress the bed of beverage preparation material (such as coffee) within the capsule, which allows the beverage preparation medium (typically water) to flow uniformly through the bed, thus minimizing channeling of liquid through the beverage preparation material during brewing and improving extraction of the beverage preparation material into the beverage preparation medium.

Suitably, the pressure pads are resilient. Accordingly, the pressure pads may deform and adjust to compensate for the irregular form of beverage preparation capsules and/or different amounts of ingredient inside the capsules, and may also compensate for variations in pressure during fluid injection thus regulating the hydrostatic pressure within the capsule. This results in a more uniform exposure of the compressed bed of beverage preparation material to the liquid medium (typically water) which improves diffusion. This provides a beverage of increased quality whilst simultaneously reducing waste of beverage preparation material due to channeling Furthermore, this deformability allows the pressure pads to adapt to beverage preparation capsules containing different amounts of ingredients, improving the versatility of the clamp assembly.

For instance, in the above aspect and embodiments, the one or more pressure pads may be formed of, or may be covered with, a material that is conformable but substantially incompressible, for example a resilient material, such as elastomer. Typically, the elastomer has a Shore hardness of from 10 to 60 Shore, preferably from 20 to 50 Shore. In a suitable embodiment, the one or more pressure pads are formed entirely of a resilient material, such as elastomer.

Accordingly, the beverage preparation assembly of the present invention provides increased efficiency and reduced channeling of liquid through the bed of beverage preparation material leading to an overall improved method for preparing the beverage. Whilst this would benefit capsule-based beverage preparation generally, the effects are particularly beneficial in high pressure beverage preparation methods such as is required in the preparation of espresso and espresso-type beverages.

Suitably, in the above aspect and embodiments, the concave base surface of the one or more of the clamp members defining the inner wall of the chamber formed when the clamp assembly is in a closed position is profiled to conform generally to the shape of the capsule. This enables the inner surface of the chamber to conform to the outer surface of the beverage preparation capsule and thereby prevent the capsule from bursting when pressurized liquid is injected into the capsule. The accurate conformity of the clamp surface to the outer surface of the capsule in use also assists beverage brewing quality by reducing the channeling of liquid through the bed of beverage brewing ingredient, since it promotes uniform compression of the beverage brewing ingredient.

In the above aspect and embodiments, the pressure pads projecting from the inner surface of the clamp members may be configured to compress the beverage ingredient and to minimize the volume of air or liquid in the beverage preparation capsule during brewing. This advantageously minimizes the volume of liquid in the capsule thus assisting in the preparation of more concentrated beverages, such as espresso, by maximizing exposure of liquid to the bed and providing a more efficient process of beverage preparation.

The pressure pad(s) protruding from the inner surface of the clamp members into the chamber formed by the clamp members in a closed position may be of any suitable configuration to achieve the desired object of squeezing out the head space of the capsule and compressing the coffee bed inside the capsule. Typically, one or more of said pressure pads are of a substantially arcuate transverse and/or longitudinal cross section in the absence of an external force. The pressure pads suitably have a rounded (biconvex), cushion-like shape. The arcuate pressure pads suitably intersect said concave base surface at a contact angle of from about 2 degrees to about 45 degrees, for example from about 10 degrees to about 30 degrees. The arcuate pressure pads suitably have a maximum height (measured from the tangent to the underlying curve of the base surface) of from about 1 mm to about 15 mm, for example from about 4 mm to about 10 mm.

The pressure pads are suitably located principally proximate to the inlet region of the clamp enclosure. That is to say, more than half of the pressure pad volume is located in the upper half of the clamp enclosure. This positioning achieves the objective of squeezing out head space from the capsule and compressing the ingredient bed into the bottom of the capsule. This positioning also allows the profile of the pressure pads to guide the flow of water into the ingredient bed.

As noted above, a function of the pressure pads is to squeeze in particular the head space of the capsule so as to eliminate head space inside the capsule and provide a fully compacted ingredient bed inside the capsule. Accordingly, at least one of the pressure pads suitably extends close to or even contacting the opposite inside surface of the clamp cavity when the clamp is closed and empty (i.e. does not contain a capsule). In embodiments, the apex of at least one of the pressure pads is spaced no more than about 5 mm, for example no more than about 2 mm from the opposite internal surface of the clamp cavity when the clamp is closed, and it may abut said opposite internal wall. This is effective to pinch a region of the capsule between the pressure pad and the opposite internal wall thus "sealing off" said region from liquid flow to achieve the desired liquid flow pathways inside the capsule.

While squeezing the upper part of the capsule, it remains necessary for the pressure pads to allow passage of liquid to the ingredient bed in the lower part of the capsule. For this reason the pressure pad(s) are suitably profiled in transverse cross-section to define one or more longitudinal channels of lesser height. The liquid can flow through the capsule underneath these channels. Suitably, at least one of the channels is located substantially centrally so as to direct flow centrally onto the ingredient bed. For example, the pressure pad(s) may have a generally m-shaped transverse cross-section.

In embodiments, the one or more pressure pads are elongate in shape and extend generally in a direction from the inlet region towards the outlet region. In some embodiments the one or more pressure pads may each independently extend from about 20% to about 80% of the length of the chamber, for example, from about 30% to about 75% of the length of the chamber. In other words, while the pressure pad(s) are located primarily proximate to the inlet region, they may extend beyond the median line of the cavity towards the outlet region.

In some embodiments, only one pressure pad is present in the clamp assembly. In other embodiments, a clamp member comprising pressure pads may comprise more than one pressure pad. In some embodiments, from 1 to 10 pressure pads may be present. In another embodiment, from 1 to 4 pressure pads may be present, for example, a clamp member may comprise three pressure pads.

Typically, the clamp members of the present invention may be prepared with the pressure pads integrated with the inner surface of the clamp member as a single-piece structure, such as may be produced by moulding. For example, the inner surface and the pressure pads may be molded in one piece (liner) that is inserted into a recess in the inner side of a rigid base member to form the inner surface of the clamp member. The rigid base member suitably includes a circumferential wall ("frame") to enclose the edges of the elastomeric layer to reduce deformation of the layer under pressure. In such embodiments, the insert piece having the pressure pads may be demountable from the rigid base member. This would enable to the operator to easily interchange the clamp surface and/or the pressure pads, if desired. Alternatively, each pressure pad may be affixed to the inner surface of a clamp member as a separate piece.

Suitably, the layer containing the pressure pads is constrained by a rigid backing and rigid circumferential edges extending upwardly from the rigid backing around the layer, whereby the layer can support a pressure of 5 to 15 bar on the outer surface of the capsule without excessive deformation. Suitably, a resilient region should extend over the whole part of the inner surface of the clamp that will be in contact with any thin film portion of the capsule. More preferably, a layer of elastomer covers substantially the whole of the inner surface of at least one base member of the clamp that defines the cavity.

In a particularly suitable embodiment, the clamp comprises two generally concave clamp members that can be moved together to close the clamp. In these embodiments, suitably the pressure pads are present on only one of the members. Suitably, the pressure pads consist of three pillow-like (biconvex) elongate pads extending from the inlet towards the outlet. The pads suitably overlap transversely so as to present a corrugated inner surface. Suitably, the outer pads are of higher profile than the central elongate pad. Suitably, the outer pads abut against the opposite internal surface of the clamp when it is closed, but the central pad does not so abut, thereby defining a liquid flow channel between the outer pads. Suitably, the pads do not extend all the way to the outlet, thereby leaving a space in the outlet region of the clamp cavity into which the beverage ingredient is compressed.

One or both of the clamp members may include a heater to heat the beverage ingredient inside the capsule before and/or during beverage preparation. The heater may, for example, comprise an electric heater element inside or on the surface of one or both of the clamp members. In other embodiments, one or both of the clamp members may be heated by circulation of hot water or steam through conduits inside the member. The heater suitably achieves a temperature of 90-110.degree. C. at the surface of the heated clamp member. The heating of the beverage ingredient is desirable in order to provide a constant, optimized extraction temperature, for example about 90.degree. C. to 95.degree. C. for espresso coffee. In the absence of external heating the thermal energy needed to heat up the beverage ingredient can cause an initial drop in the brewing temperature below optimum values, especially for drinks that require a low-volume of hot water, such as espresso coffee.

In embodiments, the configuration of the clamp cavity is fixed once the clamp elements have been brought into engagement to clamp the capsule. In other embodiments, the configuration of the clamp cavity may be varied during the beverage preparation cycle, for example as described in WO-A-0219875, the entire content of which is incorporated herein by reference.

In these embodiments, at least one clamp member comprises at least one deformable region. In other words at least one region of a member making up the inner surface of the cavity is not entirely rigid. At least one of the inner surfaces making up the clamp cavity comprises a deformable region that permits the shape of that surface, and hence of the cavity or of the exit pathway, to vary under independent control after the clamp has been closed so as to conform to a desired brewing configuration of the capsule. This change in the shape of one of the cavity surfaces is usually a change in the curvature of the surface. For example, the deformable region may be resilient and/or flexible. The deformable region is mounted on a support that is independently movable while the clamp is in said closed position. That is to say, the support for the deformable region is movable independently of the other clamp members to vary the shape of the cavity. This enables the shape and volume of the cavity to be controlled by varying an external force applied to the support, for example a mechanical or hydraulic force. Suitably, the deformable region is located on the same side of the clamp as the pressure pads, and in embodiments the pressure pads are deformable.

In embodiments, the pressure pads and concave surface are formed integrally from a sheet of elastomer that is mounted about its periphery to a rigid frame. The bottom of the frame defines the outlet pinch region as discussed herein. Behind the elastomer sheet there is mounted one or more supports to support the sheet of elastomer. One or more of the supports is movable to displace the sheet of elastomer. In embodiments, the movable support is a piston face abutting the back of the elastomer sheet.

Suitably, the deformable region is adapted to abut directly against and compress a region of the surface of the capsule during brewing. This enhances the ability to adapt the cavity to capsules of different sizes, for example for brewing different strengths of beverage with the same amount of brewing liquid. The deformable region also enables additional pressure to be applied to the capsule, for example to compact a bed of the beverage brewing ingredient in the capsule during brewing. This, of course, is especially useful for brewing espresso style coffee. Similarly, the ability to deform the brewing cavity in the exit region enables the size of the exit aperture to be controlled, and thereby enables the hydrostatic pressure in the brewing cavity during brewing to be controlled in conjunction with control over the rate of escape of the beverage from the cavity.

The control over the shape of the clamp cavity provided by the deformable region may be static or dynamic. That is to say, the deformable region may be used to preset the shape of the cavity after the capsule has been clamped but before brewing, and to maintain that shape throughout the brewing step. Alternatively, the shape of the brewing cavity may vary in dynamic fashion during the beverage brewing as described in more detail below.

Dynamic control over the shape of the brewing cavity and exit region can also be achieved where the deformable region comprises a movable region supported on a fluid reservoir. The movable region may be an elastomer sheet defining the concave surface and the pressure pads as described above. The fluid reservoir is preferably a liquid reservoir and therefore substantially incompressible.

In these embodiments, the apparatus further comprises a conduit to introduce or remove fluid from the reservoir in order to vary the shape of the cavity during or immediately prior to brewing. Control over the amount of fluid in the reservoir can be achieved, for example, by including a mechanical or electromechanical valve, or even an electrorheological fluid in the conduit. Preferably, the conduit is connected to a pump or other mechanical or electromechanical driving means for introducing or removing fluid from the cavity. The apparatus may include means to substantially equalizing the pressure of a fluid inside the capsule and in the fluid filled reservoir, so as to minimize stress on the wall of the capsule.

A further degree of control over the shape of the brewing cavity can be obtained when at least one clamping member comprises a plurality of deformable regions that are mounted on a plurality of independently movable supports. The support may be independently mechanically movable, or the deformable regions may comprise a plurality of fluid filled reservoirs supporting a plurality of movable regions as hereinbefore described. The contents of the plurality of fluid filled reservoirs may be independently controlled. Of course, the inner surface of clamp may comprise, in addition to the one or more deformable regions supported on independent supports, at least one region of solid elastomer supported on a rigid base part of the clamp.

The maximum volume of the brewing cavity when the clamp is in the closed position is in the absence of internal pressure is suitably from about 25 cm.sup.3 to about 250 cm.sup.3, more suitably from about 30 cm.sup.3 to about 150 cm.sup.3. The minimum volume when the side walls are fully compressed is preferably 50% or less of the maximum volume, more preferably 25% or less of the maximum volume.

Referring to FIG. 10, the drawing shows a schematic section of a clamp assembly being used in an apparatus according to the invention to prepare a beverage from a capsule according to the invention. The clamp comprises left and right clamp shells 110,111. The right clamp shell 111 is formed of metal or a hard plastic such as polytetrafluoroethylene. The left clamp shell 110 has a frame 140 of metal or a hard plastic such as polytetrafluoroethylene. A sheet 112 of resilient elastomer is bonded to the frame around its periphery 143. The sheet 112 is supported by a solid piston face 142 that is movable laterally to press the elastomer sheet 112 forward to a first position where it forms a conformable fit around the capsule 130, or further to one or more second forward positions for compression of the coffee bed before or after brewing. The right clamp shell 111 has an electrical heating element 113 embedded therein for pre-heating of the capsule contents. The inner surfaces of the shells 110,111 are concave to receive and tightly enclose the capsule during beverage preparation. In this embodiment the shells are mounted in parallel and moved directly into abutment by suitable mechanical clamping means such as a vice, lever arm or the like (not shown). The sealed edges 131 of the capsule are gripped by the edges of the clamp shells.

Figure 11:
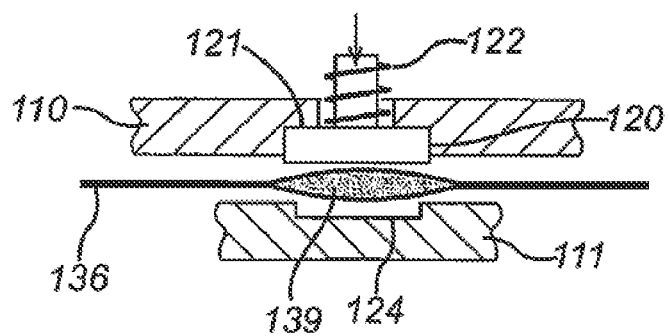
FIG. 11 shows a transverse sectional view through the outlet region of the capsule and clamp assembly of FIG. 10.

The bottom of the clamp shells 110,111 is positioned to pinch the intermediate transverse seal 136 and outlet channel of the capsule. The downstream chamber 138 of the capsule is therefore positioned outside the clamp during the beverage preparation step. The bottom of the clamp shells has elements for applying a controlled pinch force to the outlet channel of the capsule as shown in more detail in FIG. 11. The bottom face of the first clamp shell comprises an opening 120 and a piston 121 seated in the opening and capable of reciprocal motion relative to the inside surface of the clamp shell. The piston is spring loaded so as to apply a biasing force to the piston to press the front face of the piston against the capsule in the region of the outlet channel with a fixed (but adjustable) force. The bottom face of the second clamp shell 111 comprises a shallow recess 124 suitably 0.5-4 mm deep situated in the centre of the pinch zone opposite the outlet channel of the capsule.

In use, the capsule is inserted into the clamp of the beverage brewing machine, where it is gripped by the clamp with sufficient force to resist the pressure of fluid injected into the capsule. The capsule is preheated by the heater 113 before and during beverage preparation. A hollow needle 117 is inserted through the channel in the top of the clamp and into the nozzle bore of the capsule to pierce the membrane seal, and hot water is injected at a pressure of approximately 10 bar gauge to brew coffee inside the capsule.

An O-ring 116 is fitted in a fixed position on the injection tube and held in said position by flanges on the injection tube for sealing against a complementary annular recess in the top of the capsule nozzle 114. The pinch applied to the outlet channel of the capsule is just sufficient to permit the resulting beverage to escape through the outlet channel at the desired rate while maintaining high pressure inside the capsule, without excessive build-up of back pressure in the ingredient chamber.

The pressure and temperature of the hot coffee in the downstream chamber causes the weakly bonded margin region 133 at the bottom of the capsule to peel apart, releasing the resulting coffee in a controlled fashion.

Figure 12:
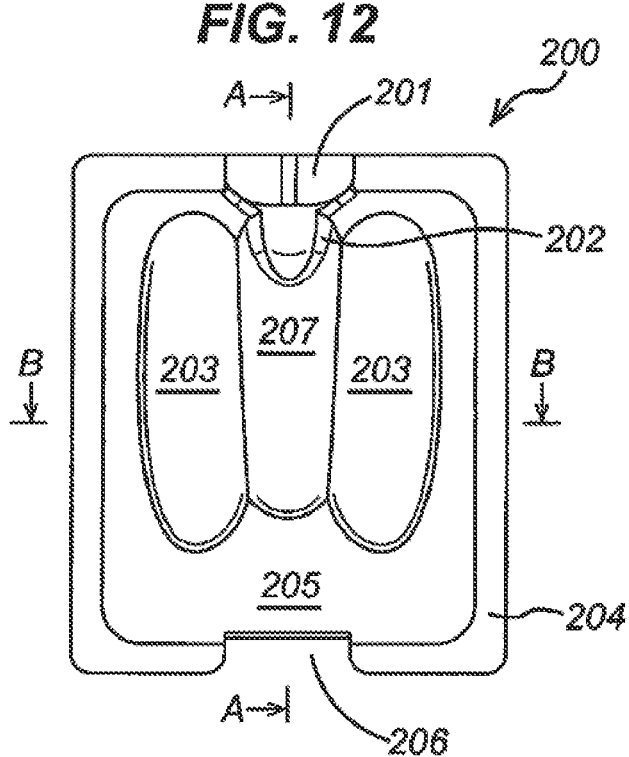
FIG. 12 shows a front view of a clamp member for a clamp assembly according to an embodiment of the present invention.
Figure 13:
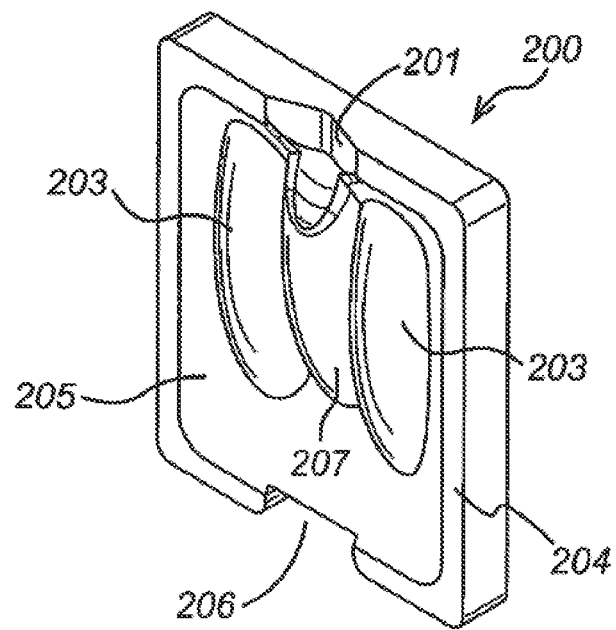
FIG. 13 shows a perspective view of the clamp member of FIG. 12.

Referring to FIGS. 12 and 13, the clamp member 200 according to an embodiment of the invention comprises an outer clamp shell 204 formed of metal or a hard plastic such as polytetrafluorethylene. The outer clamp shell 204 has a substantially rectangular recess 211 in an inner side thereof, in which is received a molded integral sheet (resilient insert 205) of resilient solid elastomer to form a capsule-contacting inner surface of the clamp. A suitable elastomer is silicone elastomer having a Shore hardness of about 30. The inside surface of the elastomer sheet is profiled to tightly enclose the capsule when the clamp is closed for beverage preparation. The profiling of the inside surface is substantially concave to conform to the outer surface of a beverage preparation capsule, with pressure pads as described further below. The clamp member has a recess 201 formed in the top of the clamp shell 204 and a cutaway section 202 in the central pressure pad 207 that together form an opening at the top of the clamp assembly dimensioned to enclose the inlet nozzle of the capsule when the clamp assembly is in a closed position, thus defining the inlet region of the chamber. The outlet region is defined by a cutaway section 206 in the bottom of the clamp shell and inner surface. The inlet region is adapted to allow the injection of water into a beverage preparation capsule enclosed within the chamber formed by two clamp members and the outlet region is adapted to allow the prepared beverage to escape from the bottom of the enclosed capsule and out of the clamp assembly for consumption.

Three pressure pads 203 and 207 are formed integrally with the rest of the resilient insert 205 and extend longitudinally in a direction from a region proximate to the inlet region 201/202 towards the outlet region 206. The pressure pads project inwardly from a concave base surface 212 of the resilient insert 205 enabling the selective constriction of the region of the capsule proximate to said inlet region. In this embodiment, all have substantially arcuate longitudinal and transverse cross sections (see FIGS. 14 and 15 respectively). In the embodiment depicted in FIGS. 12-16, the outer pressure pads 203 have different geometrical dimensions to central pressure pad 207. In particular, the outer pressure pads 203 are higher than the central pressure pad 207, whereby the outer pressure pads abut against the opposite internal surface of the clamp chamber when closed to direct the flow of water through a gap intermediate the outer pressure pads 203.

Referring to FIGS. 14-16, the side view shows in this embodiment the pressure pads 203 and 207 projecting laterally from the cavity of the concave base surface 212 to outside of the profile of the outer clamp shell 204. The pressure pads may suitably deform to allow two such clamp members 200 to abut in a closed position of a clamp assembly according to the invention.

Referring to the longitudinal cross section along line "A" of FIG. 12 seen in FIG. 15, the concave inner surface 205 is visible against the outer clamp shell 204 and the different lengths and depths of the pressure pads 203 and 207 of this embodiment can be seen.

Referring to the transverse cross section along line "B" of FIG. 12 seen in FIG. 16, the concave base surface 212 is clearly visible against the outer clamp shell 204 and the different widths and depths of the pressure pads 203 and 207 of this embodiment are evident.

this embodiment the pressure pads are solid projections formed of resilient material. In alternative embodiment, the resilient pressure pads may be hollow, whereby a fluid-filled cavity inside one or more of the pressure pads may be inflated to change the shape of the pressure pads before, during, or after beverage preparation in order to achieve compaction of the beverage preparation ingredient before or during beverage preparation and/or dewatering of the ingredient after beverage preparation. In these embodiments, the clamp base includes one or more channels for pumping fluid into or out of the cavity or cavities, and the apparatus further comprises a source of pressurized fluid, preferably pressurized liquid, for this purpose.

Preferably, volume can be reduced to less than 50% of the brewing volume.

In a further aspect, the present invention provides a beverage preparation apparatus comprising: one or more clamp assemblies according to the present invention; an injector for injecting water into a capsule held inside the clamp assembly; and a pump for pumping said water through said injector at a pressure greater than 1 bar gauge.

The apparatus according to the present invention suitably comprises an injector tube or tubes for injecting the aqueous fluid into the interior of the capsule when the capsule is held in the brewing cavity. Suitably, the apparatus further comprises a mechanism operatively associated with the clamp to retract the injector tube or tubes when the clamp is opened. The injector tube may be inserted into a nozzle on the top of the capsule as described in GB-A-2121762. The injector tube suitably communicates with the source of pressurized water through a check valve, such as a ball valve, that opens under pressures greater than for example about 5 bar to allow water to pass through the tube under pressure but that blocks dripping of water from the injector tube when it is not in use, e.g. due to thermal expansion of water during warm-up of the brewer. Suitably, an O-ring is mounted around the injector tube for forming a pressure-tight seal with an inlet nozzle of the capsule as described further below. The O-ring may be held in place by a flange or sleeve fixed to the injection tube above and abutting the O-ring.

The apparatus comprises a pump for supplying water to the injector tube at pressures greater than 5 bar gauge, for example at 10-15 bar gauge. A typical pump is a shuttle pump that operates at fixed displacement and fixed speed, whereby the water flow rate decreases as the back pressure increases up to a maximum pressure of typically about 16 bar. Suitably, the apparatus further comprises a heater to supply an aqueous brewing medium such as hot water or steam, suitably hot water at a temperature of suitably about 80 to about 100.degree. C. to the pump.

In certain embodiments, the apparatus may comprise a pressure sensor to measure the pressure in the liquid inlet line to the capsule in the clamp (the back pressure). In embodiments, the apparatus may further comprise control elements to vary the pump output and/or the configuration of the outlet channel region of the clamp in response to the measured back pressure, for example to maintain a substantially constant back pressure during beverage preparation.

In certain embodiments, the apparatus may comprise a second clamp assembly for holding a second capsule, an injector for injecting water into a capsule held inside the clamp assembly; and a pump for pumping said water through said injector at a pressure less than about 1 bar gauge. The second clamp and injector may, for example, be similar to those described in the aforementioned patent specifications GB-A-2121762, GB-A-2122881, EP-A-0179641, EP-A-0247841 and WO-A-9905044. In this way a single apparatus has clamps adapted, respectively, for high-pressure and low-pressure beverage preparation. Suitably, the first and second clamp assemblies are in a single housing with a single control system and display associated therewith.

Suitably, the apparatus may comprise a control system and display programmed to prompt a user to carry out the following sequential steps: (a) select a beverage to be prepared; (b) insert a capsule into the appropriate clamp; and (c) wait while a beverage is prepared from the capsule.

In typical embodiments the prompt (a) directs the user to select from various beverage options, such as filter coffee, filter tea, espresso coffee, or two-component beverages such as cappuccino coffee.

The prompt to select a beverage may be by means of one or more menu selection screens accessed by soft keys. The apparatus may also be programmed to prompt the user to provide a payment before or after said step (a). The payment may be by means of a coin-freed mechanism, or a card swipe, or some other automatic debiting procedure provided in the system.

The display may show a welcome screen, such as a logo or a picture of a cup of coffee, when not in use. The apparatus may also be programmed to prompt the user to place a receptacle in a beverage receiving location ("cup station") of the apparatus before said step (a). The apparatus may comprise a cup-detect interlock, for example an infrared detector interlock, to block or interrupt the operation of the apparatus if there is no receptacle in a beverage receiving position in the apparatus. The control system may be adapted to provide a prompt to the user to insert a cup if no cup is detected in the cup receiving station at any stage of the procedure.

The control system and display may comprise for example a liquid crystal display and soft key controls. In addition or as an alternative to visual prompts on the display screen, the prompt (b) may include mechanically opening the appropriate clamp to permit insertion of a capsule. The prompt (b) may include a visual prompt on the display to select a capsule of the type appropriate for that clamp (i.e. a high-pressure capsule according to the present invention for a high-pressure beverage such as espresso coffee, or a conventional FLAVIA capsule for a low-pressure beverage for preparation in the low-pressure clamp).

Alternatively or additionally, the beverage making apparatus may further provide a prompt after prompt (c), to perform the following step: (d) transfer receptacle from a beverage receiving station below the second clamp assembly to a beverage receiving station below the first clamp assembly. This prompt would be appropriate, for example, if a two-component beverage is being prepared for example a cappuccino-type beverage comprising a hot foamed dairy component prepared in the second clamp assembly from a whitener/milk capsule, to which is then added a shot of espresso coffee prepared from a coffee capsule in the first clamp assembly.

Thus, in these embodiments, the beverage making apparatus comprises a control system and display programmed to prompt a user to carry out the following sequential steps in response to a command to brew a multicomponent beverage: (a) insert a first capsule containing a first beverage brewing ingredient into one of the clamps; (b) wait while a first beverage component is brewed from the first capsule; (c) transfer the receptacle from the cup receiving station of the said one clamp to the cup receiving station of the other clamp; (d) insert a second capsule containing a second beverage brewing ingredient into the holder of the other clamp; and (e) wait while a second beverage component is brewed from the second capsule.

In yet other embodiments, the apparatus is capable of preparing both beverage components in a single clamp, for example if the clamp assembly according to the invention has an outlet region that can be adjusted to provide a larger opening resulting in low back-pressure in the ingredient chamber for preparation of filter coffee or foamed milk components, followed by a smaller opening to provide a high back-pressure for preparation of an espresso coffee shot. In these embodiments the control system and display are programmed to prompt a user to carry out the following sequential steps in response to a command to brew a multicomponent beverage: (a) insert a first capsule containing a first beverage brewing ingredient into the clamp; (b) wait while a first beverage component is brewed from the first capsule; (c) insert a second capsule containing a second beverage brewing ingredient into the holder; and (d) wait while a second beverage component is brewed from the second capsule.

In all of the above embodiments, the beverage making apparatus may further provide a final prompt to perform the following step: remove receptacle containing the beverage from the apparatus.

The beverage making apparatus suitably further comprises a mechanical ejection means for ejecting capsules from the holder after water injection is complete. Preferably, the apparatus further comprises a mechanism operatively associated with the holder to retract the injection tube or tubes when the holder is opened.

Suitably, the beverage making apparatus further comprises a water jet-forming nozzle supplied by one of the pumps for directing a jet of water into a liquid in a receptacle in the cup receiving station of one or both clamps to foam the liquid by high-shear mixing of air and liquid when it hits the surface of a liquid in a receptacle. The internal cross sectional area of the jet-forming outlet of the nozzle is generally from about 0.2 to about 3 mm.sup.2, preferably from about 0.4 to about 2 mm.sup.2, for example about 1 mm.sup.2. Since water is substantially incompressible and not significantly viscoelastic, it follows that a circular water jet is produced having a diameter of from about 0.5 to about 2 mm, preferably from about 0.7 to about 1.5 mm. Details of such jet-forming nozzles and their use to produce foamed beverages are described in WO-A-02087400, the entire content of which is incorporated herein by reference.

Suitably, the beverage making apparatus further comprises a capsule recognition device in the clamp assembly operatively associated with the control system and the display of the apparatus. At its simplest, this device may be a simple bimodal detector, such as a source of UV light and a light detector, for detecting whether a fluorescent region is present on a capsule. More complex capsule recognition devices such as bar code readers or RFID chip detectors are also contemplated. The primary purpose of the capsule recognition device is to determine whether the right type of capsule has been inserted into the clamp, i.e. a high-pressure capsule of the kind described in accordance with the present invention for a high pressure brewing clamp, or a low pressure capsule such as the conventional FLAVIA type capsules for a low pressure configuration clamp. If the recognition device determines that the wrong type of capsule has been inserted, then the control system is programmed to prompt the user to change the capsule. In embodiments, the recognition device may read further information from the capsule relating to the capsule ingredients and the control system then adapts the brew cycle parameters such time/temperature/water volume to optimize the product for that ingredient.

Figure 17:
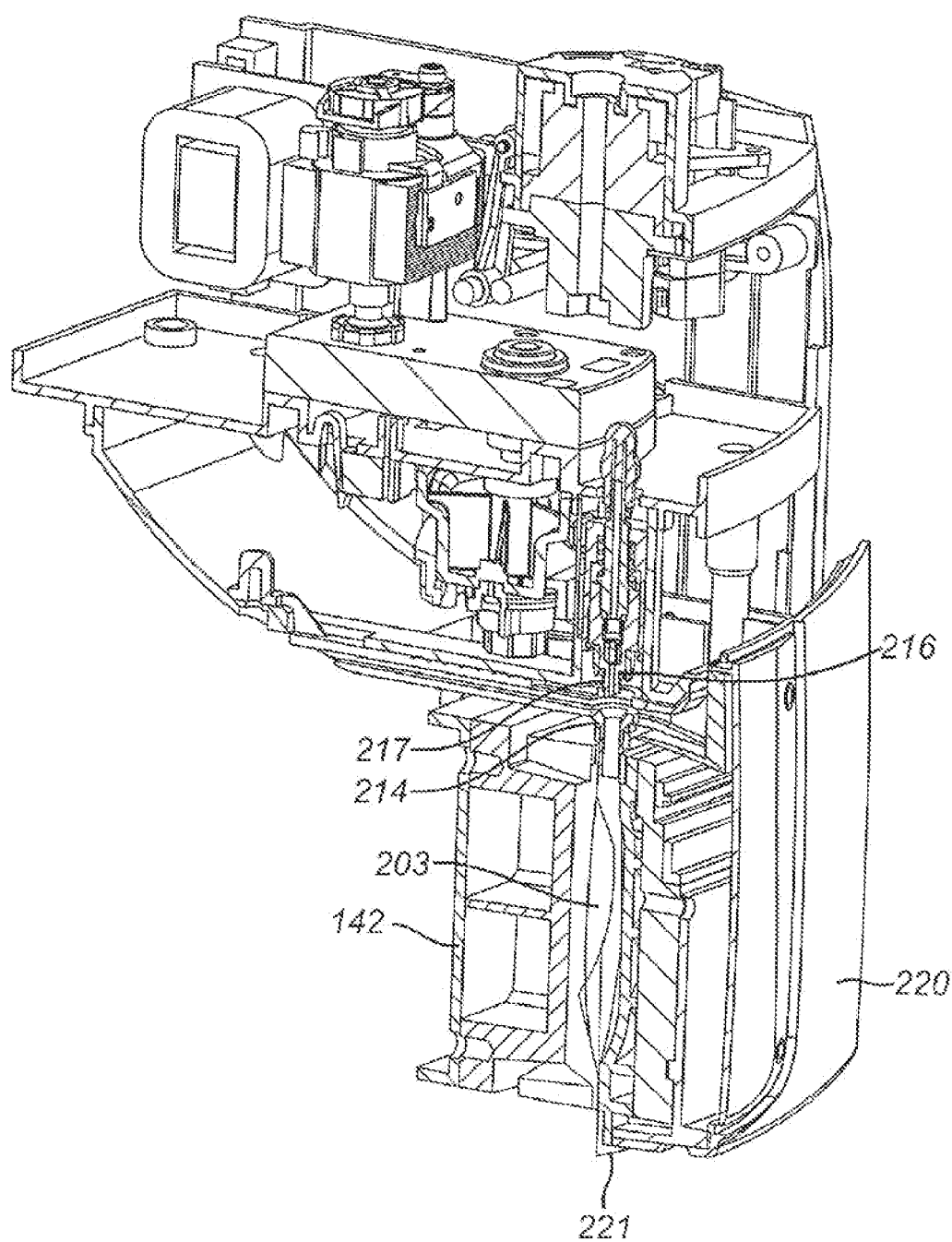
FIG. 17 shows a general cut-away view of a beverage preparation machine according to the present invention.

FIG. 17 shows a general view, partially cut-away, of a beverage making apparatus according to the invention. Visible are the cavity for receiving the beverage capsule with the pillow pads 203 projecting into the cavity. The elastomeric sheet with the pillow pads 203 is supported on movable piston 142. The front clamp shell is hinged at the bottom 221 so that door 220 can pivot outwardly for insertion of a capsule into the capsule cavity. Injector 117 is mounted on a suitable drive mechanism for automatic retraction and insertion into the capsule. O-ring 116 is mounted on a flange on the injector so that it forms a seal against a countersunk top rim 214 of the nozzle holder of the clamp (i.e. in this embodiment the O-ring seals against the top of the clamp, not against the top of the capsule nozzle itself).

In a further aspect, the present invention provides a beverage preparation system comprising a beverage preparation apparatus according to the present invention, and further comprising one or more beverage preparation capsules according to the invention.

Suitably, the system comprises both capsules according to the invention (e.g. for preparing espresso shots) and capsules not according to the invention, for low pressure beverage preparations such as filter coffee, filter tea, or hot foamed milk for subsequent addition to an espresso shot to form a cappuccino. The capsules not according to the invention are suitably made in accordance with one of the FLAVIA patents identified above. The hot foamed milk capsules suitably contain a solid or liquid milk concentrate for example as described in detail in WO-A-02087400.

In a further aspect, the present invention provides a method of making a beverage comprising inserting a beverage preparation capsule according to the invention into the clamp assembly of a beverage preparation apparatus according to the present invention such that the outlet channel of said capsule is pinched between the clamp members in said outlet region; injecting an aqueous liquid into said capsule in said inlet region to produce a beverage in said capsule; and allowing said beverage to escape through said outlet channel and downstream chamber (where present).

The bottom of the capsule extends through the exit region of the clamp, whereby the beverage exiting the capsule does not contact the clamp. This substantially eliminates cross-contamination between successive beverages prepared in the same clamp.

In these methods, the beverage preparation capsule is inserted into the clamp assembly of the beverage brewing machine, where it is gripped by the clamp members with sufficient force to resist the pressure of fluid injected into the capsule. The clamp members are mounted in parallel and moved directly into abutment by suitable mechanical clamping means such as a vice, lever arm or the like (not shown). The sealed edges 31 of the capsule are gripped by the edges of the clamp shells. An O-ring may be fitted in the clamp above the nozzle for sealing against the water injection tube of the apparatus. Alternatively, the O-ring may be fitted at a fixed position on the injection tube and held in said position by flanges on the injection tube.

The pressure pads extending along the inner wall of the chamber enclosing the capsule contact and compress the beverage preparation capsule when the clamp is closed around the capsule. The compressed bed of coffee (or other ingredient) inside the capsule is profiled by the buffer pads and this has been found to improve the quality of the final beverage, in particular the total extracted solids. This improvement is thought to be due to a reduction in channeling of liquid through the profiled ingredient bed inside the capsule. A further advantage of the pressure pads is that they allow the same clamp to be used for capsules containing different amounts of ingredient. Typically, systems of this type use capsules having identical dimensions but containing different amounts of ground coffee to make products of different volumes or strengths. The buffer pads enable the clamp effectively to compress capsules containing a range of different ingredient amounts.

The capsule may be preheated by a heater within the clamp assembly before and during beverage preparation. A hollow needle is inserted through the inlet region in the top of the clamp assembly and into the nozzle bore of the capsule to pierce the membrane seal, and hot water is injected at a pressure of approximately 10 bar gauge to brew coffee inside the capsule. The pressure and temperature of the hot coffee in the downstream chamber causes the weakly bonded margin region at the bottom of the capsule to peel apart, releasing the resulting coffee from the outlet of the clamp assembly in a controlled fashion.

When a pinch is applied to the outlet channel of the capsule as discussed above, the pinch force is just sufficient to permit the resulting beverage to escape through the outlet channel at the desired rate while maintaining high pressure inside the capsule, without excessive build-up of back pressure in the ingredient chamber.

Suitably, the aqueous fluid is injected at a pressure of from about 5 to about 15 bar gauge, for example about 10 bar gauge. Typically, the aqueous fluid is injected at a temperature of from about 88.degree. C. to about 98.degree. C., for example about 90.degree. C. The liquid may be injected into the capsule at an average rate suitably from about 25 ml/min to about 500 ml/min and more preferably from about 50 to about 150 ml/min. The duration of the water injection is suitably from about 10 to about 30 seconds, for example about 12 to about 15 seconds. Suitably, the aqueous fluid consists essentially of water and the brewing ingredient comprises ground coffee. This enables espresso-type coffee to be produced.

The liquid may be injected in intermittent or pulsed fashion to optimize the organoleptic properties of the product. The method may further comprise the step of injecting air into the capsule after brewing to expel residual beverage from the capsule. Alternatively or additionally, dewatering of the residue may be achieved by compressing the ingredient bed after brewing by moving one or both movable clamp walls inwardly as described above. A similar compression of the ingredient (e.g. ground coffee) bed may be performed before water injection to consolidate the ingredient bed. Experiments have shown that there is an optimum degree of compression of the ingredient bed that gives maximum formation of espresso crema and other espresso-like characteristics in the coffee.

Suitably, substantially all steps of the method other than the selection of beverage type and insertion of the capsule into the clamp are performed automatically by the apparatus.

It will be appreciated that, for economy of the description, the preferred and alternative features have in some cases been described in relation to only one aspect of the invention even though they are applicable to all of the other aspects. Accordingly, any feature that has been described above in relation to any one aspect of the invention may also be applied to any other aspect of the invention.

The above embodiments have been described by way of example only. Many other embodiments falling within the scope of the accompanying claims will be apparent to the skilled reader.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A clamp assembly for preparing a beverage from a capsule containing a beverage preparation ingredient, the clamp assembly comprising:
   a first clamp member and a second clamp member that define a clamp cavity for accommodating the capsule, the clamp cavity having a first end defining an inlet for injection of a liquid into the capsule and a second end defining an outlet for escape of a beverage from the capsule;
   at least one of the first and second clamp members comprising:
      an outer clamp shell having an inner surface facing the clamp cavity, the inner surface comprising a recess; and
      an insert disposed within the recess of the outer clamp shell, the insert comprising:
         a base portion having an outer surface that is flush with or recessed relative to the inner surface of the outer clamp shell; and
         at least one pressure pad having an outer surface that protrudes beyond the inner surface of the outer clamp shell; and
      wherein the base portion of the resilient insert is concave and the at least one pressure pad is convex.

2. The clamp assembly according to claim 1 wherein the first and second clamp members are configured to support the capsule so that a first portion of the capsule is disposed within the clamp cavity and a second portion of the capsule protrudes from the second end of the clamp cavity.

3. The clamp assembly according to claim 1 wherein the at least one pressure pad comprises a first pressure pad, a second pressure pad, and a third pressure pad located between the first and second pressure pads, wherein the first and second pressure pads protrude further beyond the inner surface of the outer clamp shell than the third pressure pad.

4. The clamp assembly according to claim 1 wherein the clamp cavity comprises a median line that divides the clamp cavity into an inlet region adjacent to the inlet and an outlet region adjacent to the outlet, wherein the at least one pressure pad is elongated in a direction between the first and second ends of the clamp cavity, and wherein more than half of a length of the at least one pressure pad is located along the inlet region of the clamp cavity.

5. The clamp assembly according to claim 1 wherein the at least one pressure pad comprises a first pressure pad, a second pressure pad, and a third pressure pad located between the first and second pressure pads, the first and second pressure pads being longer in a direction between the inlet and the outlet than the third pressure pad.

6. The clamp assembly according to claim 1 wherein the outer clamp shell is formed of metal or a hard plastic and the insert is formed of a resilient material.

7. The clamp assembly according to claim 1 wherein the insert comprises a first portion that is adjacent to the first end of the clamp cavity and a second portion that is adjacent to the second end of the clamp cavity, the second portion being free of the at least one pressure pad.

8. The clamp assembly according to claim 1 wherein the outer surface of the at least one pressure pad is convex.

9. The clamp assembly according to claim 1 wherein the first and second clamp members are configured to pinch the capsule at a position adjacent to an outlet of the capsule.

10. The clamp assembly according to claim 1 wherein the first clamp member comprises the outer clamp shell and the insert, wherein the second clamp member comprises a concave base surface facing the clamp cavity.

11. A beverage preparation apparatus comprising:
    a clamp assembly comprising a first clamp member and a second clamp member that define a clamp cavity;
    a capsule containing a beverage preparation ingredient, a first portion of the capsule being located within the clamp cavity and a second portion of the capsule protruding from a bottom end of the clamp cavity;
    the first clamp member comprising a piston that is configured to apply a force against an outlet channel portion of the capsule that is immediately upstream of the second portion of the capsule; and wherein the first clamp member further comprises a spring to apply a biasing force onto the piston to cause the piston to apply the force against the outlet channel portion of the capsule.

12. The beverage preparation apparatus according to claim 11 wherein the first clamp member comprises a first clamp shell having an opening, the piston being seated in the opening and capable of reciprocal motion relative to an inside surface of the clamp shell.

13. The beverage preparation apparatus according to claim 12 wherein the second clamp member comprises a shallow recess that is aligned with the opening of the first clamp shell and with the piston.

14. A beverage preparation apparatus comprising:
- a clamp assembly comprising two or more clamp members, at least one clamp member being movable to open and close the clamp assembly, wherein inner walls of said clamp members in a closed position define a chamber having an inlet region for injection of water and an outlet region for escape of a beverage, wherein said inner wall of at least one of said clamp members comprises a base surface and one or more pressure pads projecting from said base surface, each of the one or more pressure pads comprising a convex exterior surface facing the chamber;
- a beverage preparation capsule containing a beverage preparation material at least partially disposed within the chamber, wherein the convex exterior surface of the one or more pressure pads contact the capsule to selectively constrict a region of the capsule proximate to said inlet region, and wherein an outlet channel of said capsule is pinched between the clamp members in said outlet region;
- an injector for injecting water into the beverage preparation capsule held inside the clamp assembly; and
- a pump for pumping said water through said injector at a pressure greater than 1 bar gauge.

* * * * *